United States Patent
Holzapfel et al.

(10) Patent No.: US 7,858,922 B2
(45) Date of Patent: Dec. 28, 2010

(54) POSITION-MEASURING DEVICE

(75) Inventors: Wolfgang Holzapfel, Obing (DE);
Michael Hermann, Tacherting (DE);
Karsten Saendig, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 92 days.

(21) Appl. No.: 11/942,413

(22) Filed: Nov. 19, 2007

(65) Prior Publication Data
US 2008/0067333 A1    Mar. 20, 2008

(30) Foreign Application Priority Data

| Nov. 20, 2006 | (DE) | ......................... 10 2006 054 780 |
| Jul. 27, 2007 | (DE) | ......................... 10 2007 035 345 |
| Oct. 10, 2007 | (EP) | ................................. 07019810 |

(51) Int. Cl.
*G01D 5/34* (2006.01)

(52) U.S. Cl. ........................ 250/231.13; 250/231.14; 356/616; 341/13; 33/707

(58) Field of Classification Search ............ 250/231.13, 250/231.14, 231.17, 231.18, 237 G, 559.29; 356/616, 617; 341/9, 13; 33/1 PT, 706, 33/707

See application file for complete search history.

(56) References Cited

U.S. PATENT DOCUMENTS

| 5,977,539 | A | 11/1999 | Holzapfel et al. |
| 6,198,534 | B1 * | 3/2001 | Hofer et al. ................. 356/399 |
| 2008/0062432 | A1 | 3/2008 | Sandig et al. |

FOREIGN PATENT DOCUMENTS

| DE | 40 21 010 | 3/1991 |
| DE | 197 48 802 | 5/1998 |
| DE | 199 21 309 | 11/2000 |
| DE | 10 2006 042 743 | 3/2008 |
| EP | 0 194 611 | 9/1986 |
| EP | 0 303 008 | 2/1989 |

\* cited by examiner

*Primary Examiner*—Kevin Pyo
(74) *Attorney, Agent, or Firm*—Kenyon & Kenyon LLP

(57) ABSTRACT

A position-measuring device includes a scanning unit and a measuring graduation that is displaceable thereto in at least one measuring direction. The measuring graduation includes two incremental-graduation tracks extending in parallel in the measuring direction, between which a reference-marking track having at least one reference marking at a reference position extends. The scanning unit includes a first scanning device for generating the reference-pulse signal and a second scanning device for generating the incremental signals. To generate the incremental signals, a scanning beam acts at least once upon each incremental graduation in an incremental-signal scanning field.

20 Claims, 22 Drawing Sheets

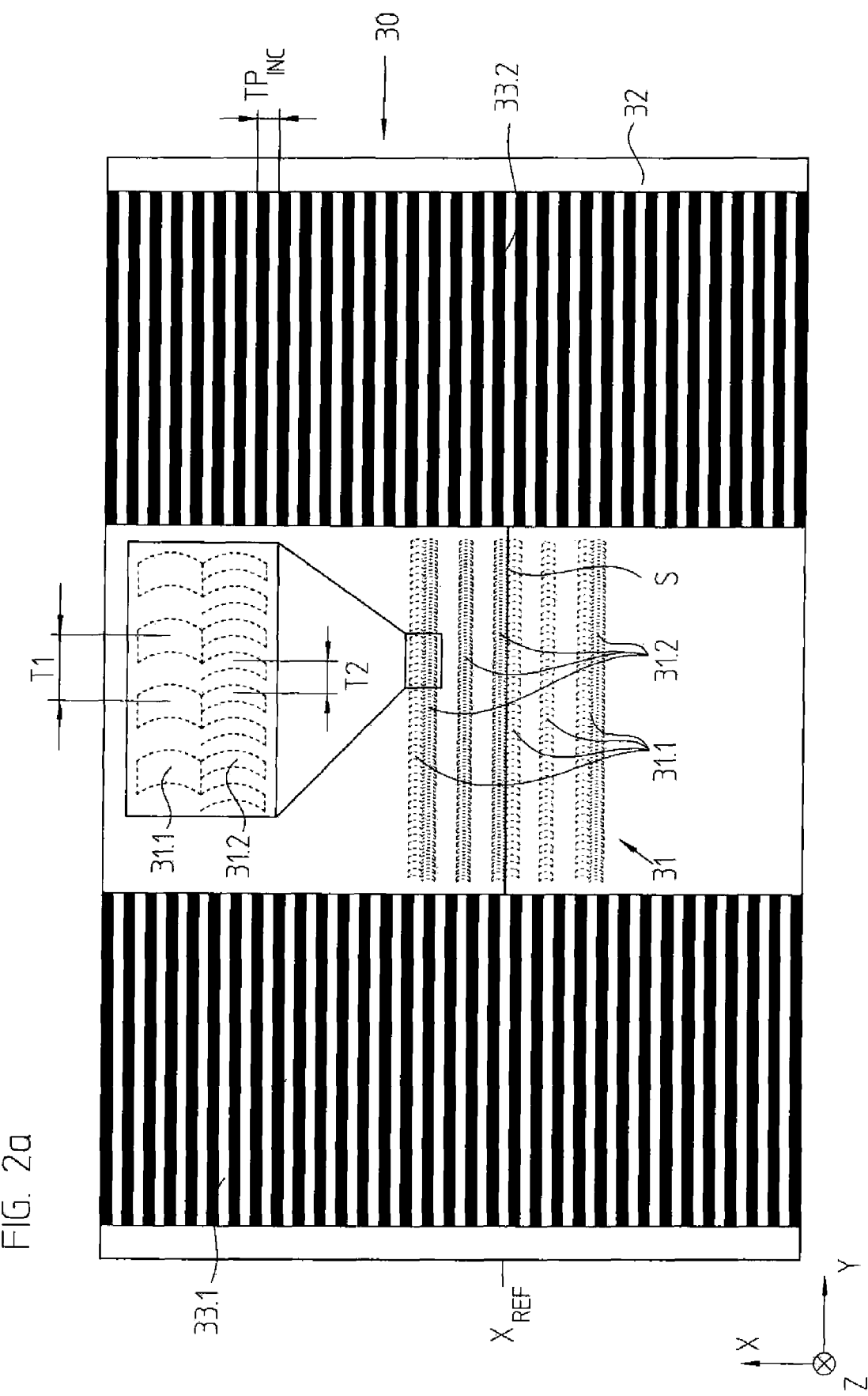

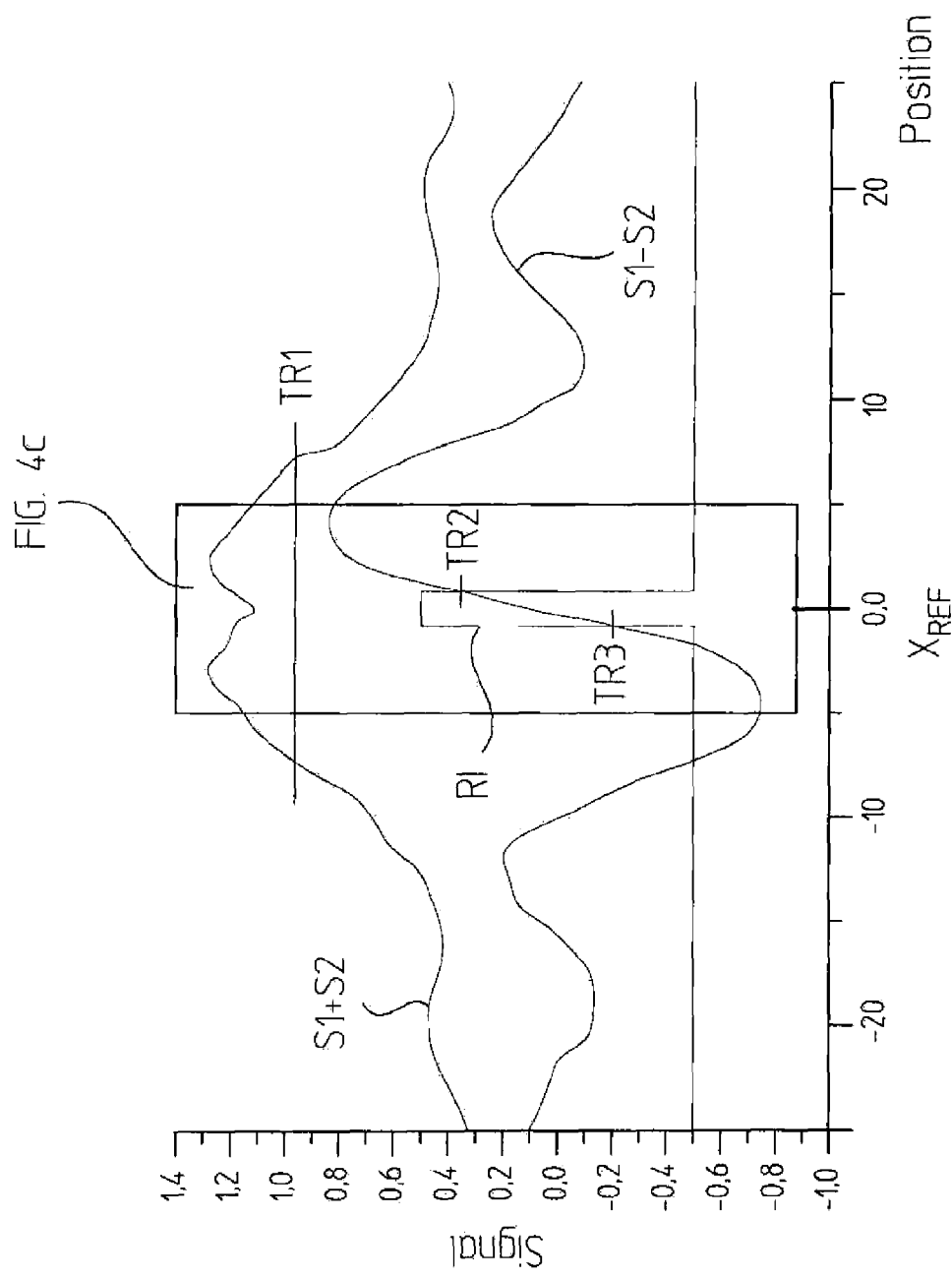

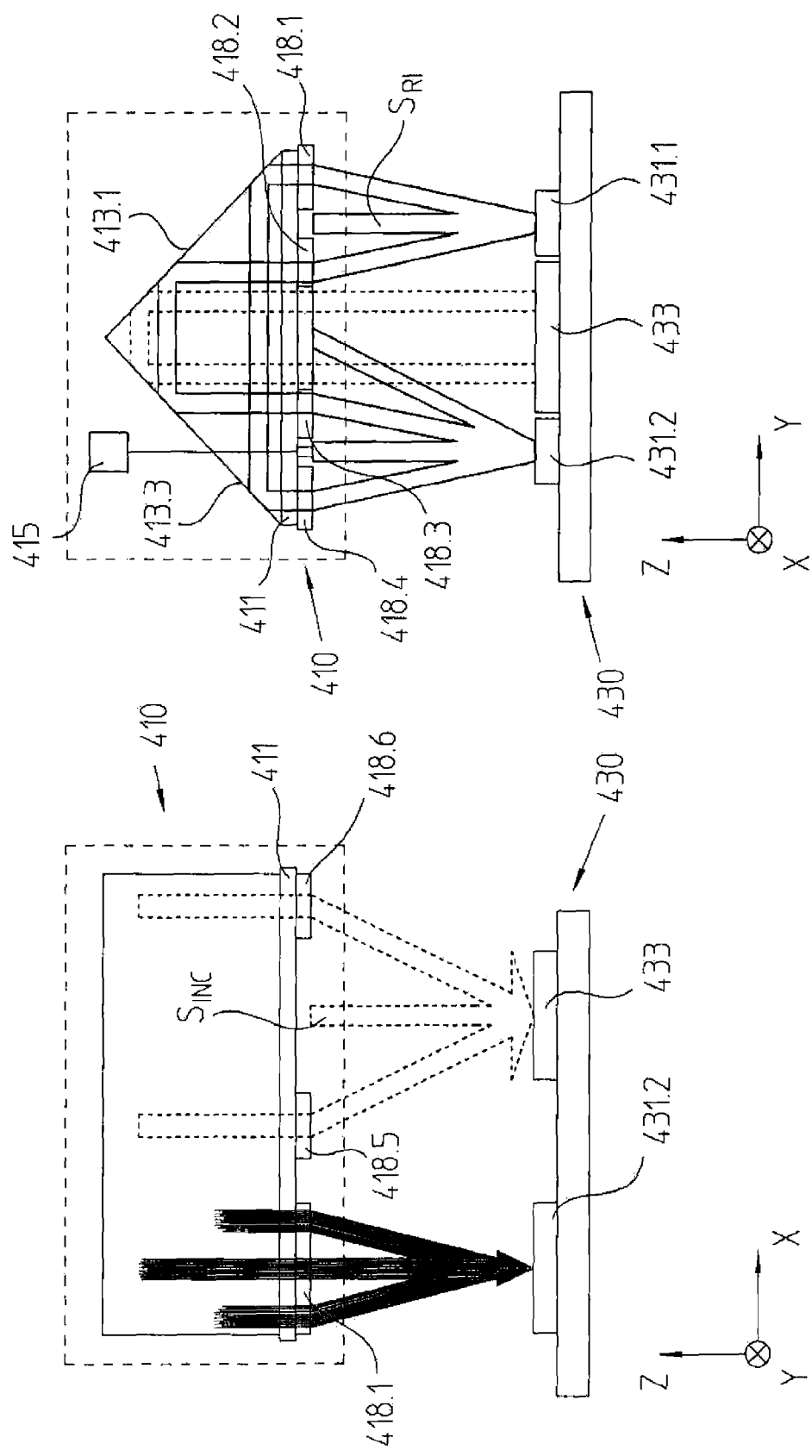

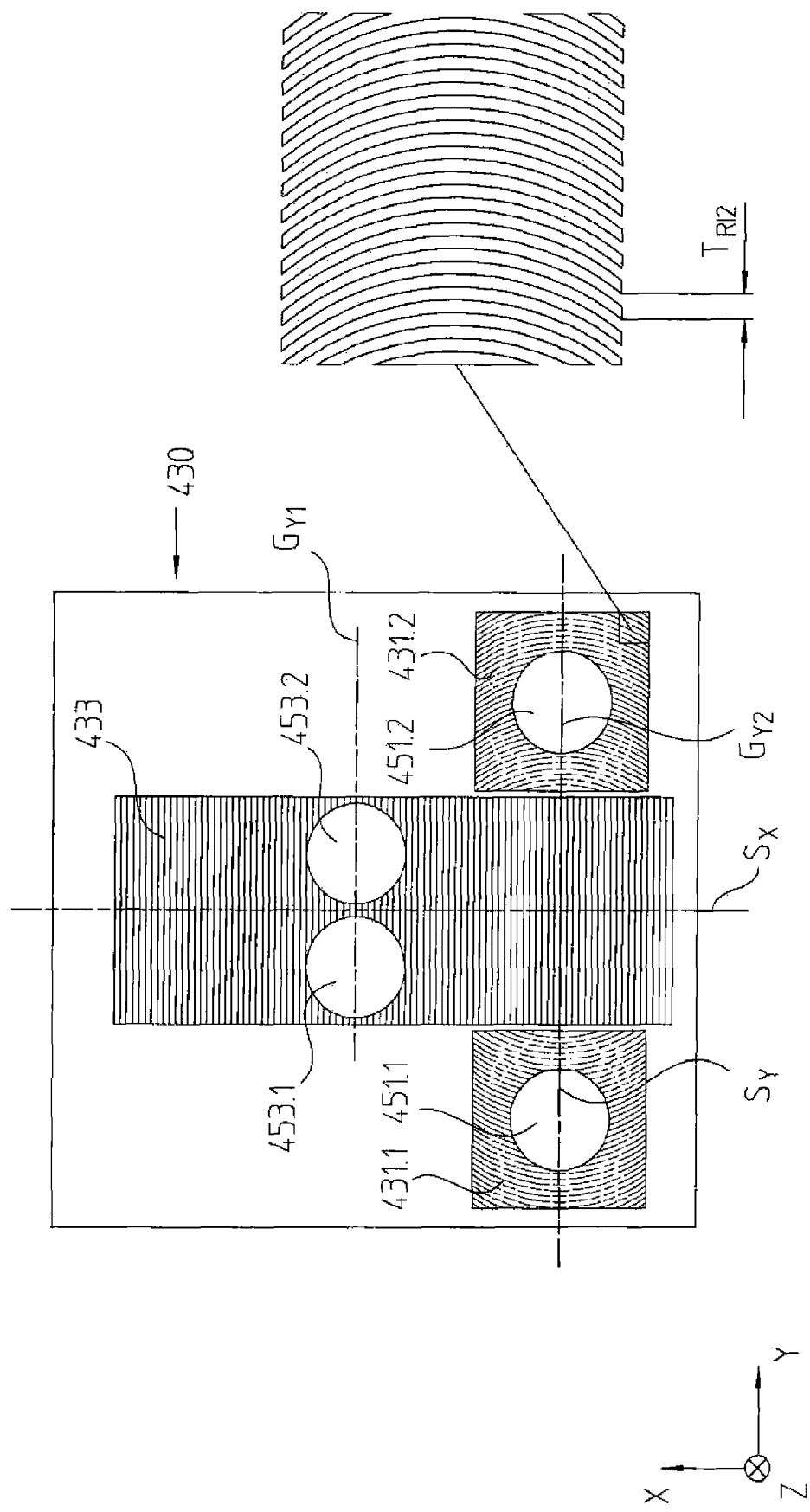

FIG. 11
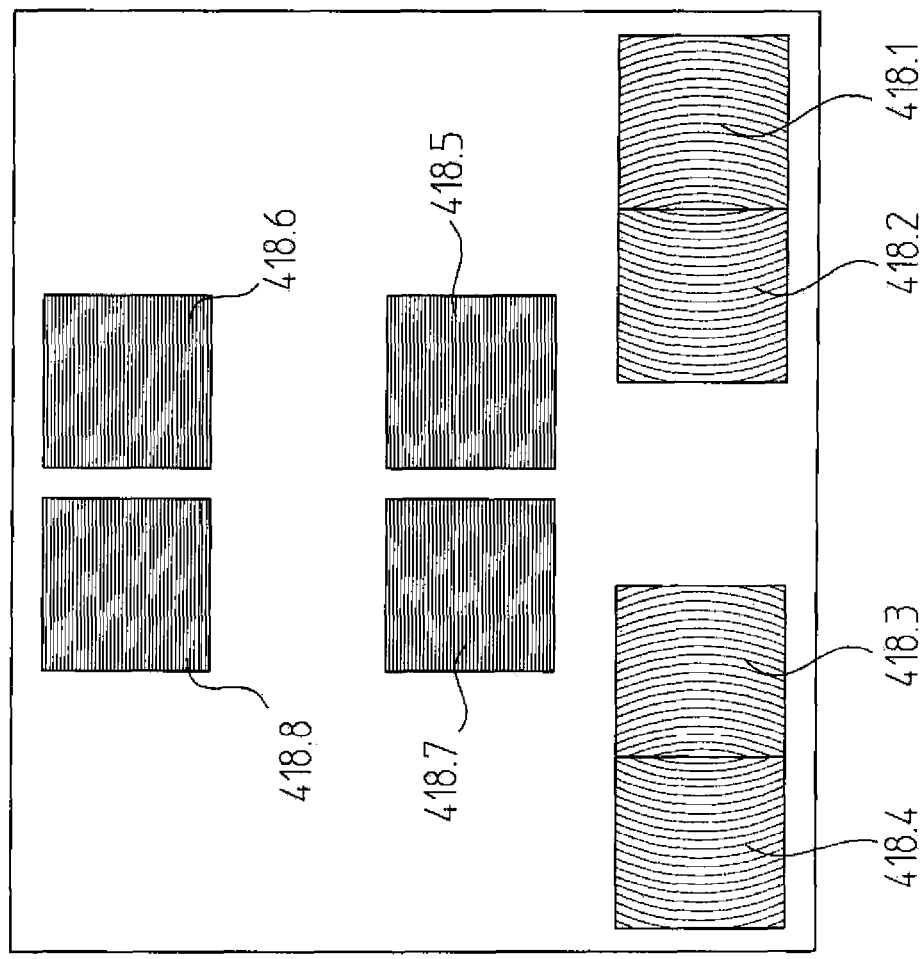
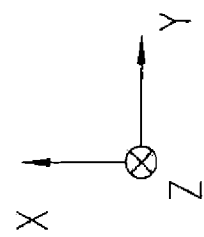

POSITION-MEASURING DEVICE

CROSS-REFERENCE TO RELATED APPLICATIONS

The present application claims priority to Application No. 10 2 006 054 780.2, filed in the Federal Republic of Germany on Nov. 20, 2006, Application No. 10 2 007 035 345.8, filed in the Federal Republic of Germany on Jul. 27, 2007, and Application No. 07 019 810.6, filed in the European Patent Office on Oct. 10, 2007, each of which is expressly incorporated herein in its entirety by reference thereto.

FIELD OF THE INVENTION

The present invention relates to a position-measuring device.

BACKGROUND INFORMATION

In addition to periodic incremental signals regarding the relative offset of two objects that are displaceable relative to one another, certain conventional position-measuring devices also supply so-called reference-pulse signals. With the aid of the reference-pulse signals, it is possible to obtain an exact absolute reference regarding the position of the two mutually displaceable objects at individual specified reference positions along the measuring path. The incremental measurement, which typically has a much higher resolution, can be related to the absolute position determined in this manner.

In connection with the generation of reference-pulse signals, a number of possibilities for the placement of reference markings on the measuring graduation scanned by the scanning unit are conventional.

A typical arrangement, for example, places one or a plurality of reference marking(s) laterally adjacent to the scanned incremental graduation track. In this regard, reference is made to European Published Patent Application No. 0 194 611, for example. However, a problem with such an arrangement is that, if undesired tilting about an axis perpendicular to the measuring-graduation plane (a so-called Moiré tilt) occurs between scanning unit and measuring graduation, this will cause a shift in the position of the generated reference-pulse signal relative to the incremental signal. The result is a faulty position determination.

For that reason, arrangements are described, for example, in European Published Patent Application No. 0 303 008, in which two incremental scale-division tracks are situated on both sides adjacent to a reference marking on the measuring graduation. The two incremental scale-graduation tracks are disposed at a mutual offset, the offset amounting to a partial amount of the graduation period, so that their separate scanning via separate scanning devices allows the generation of two 90° phase-shifted incremental signals. While faults with regard to possible Moiré tilting are able to be minimized by such an arrangement, the proposed scanning of the incremental scale-graduation tracks still is not optimal, in particular for high-resolution position measurements. For one, this approach is relatively expensive due to the separate scanning of the incremental scale-graduation tracks. In addition, if one of the two incremental scale-graduation tracks becomes contaminated, faulty measurements may result.

Furthermore, a high-resolution position-measuring device is described in German Published Patent Application No. 197 48 802, in which reference markings in the form of scale-graduation structures which are oppositely chirped in the measuring direction are disposed laterally adjacent to an incremental scale-graduation track. Similar arrangements on the side of the measuring graduation are also described in German Published Patent Application No. 199 21 309 and German Published Patent Application No. 40 21 010.

SUMMARY

Example embodiments of the present invention provide a position-measuring device that is suitable for the generation of high-resolution incremental signals and also for the generation of reference-pulse signals at least one reference position, and which is affected as little as possible by any Moiré tilting between measuring graduation and scanning unit.

According to an example embodiment of the present invention, a position-measuring device for the generation of incremental signals and a reference-pulse signal at least one reference position includes a scanning unit as well as a measuring graduation, which is displaceable thereto in at least one measuring direction. The measuring graduation includes two incremental scale-graduation tracks, which extend in parallel in the measuring graduation and have periodic incremental graduations, between which a reference-marking track is disposed, which has a reference marking at least one reference position. The scanning unit includes a first scanning device for generating the reference-pulse signal and a second scanning device for generating the incremental signals. To generate the incremental signals, a scanning beam acts at least once on each incremental graduation in an incremental-signal scanning field.

The arrangement of the position-measuring device provides that even possible Moiré tilting will not cause any errors in the position determination. Correct assignment of the generated reference-pulse signal to the desired incremental-signal period is provided at all times since the incremental graduation tracks and the reference-marking track have the same, so-called neutral Moiré axis, thereby ensuring that possible tilting of measuring graduation and scanning unit about this axis will not cause faulty measurements.

Relatively stable incremental-signal amplitudes may result even in the event of strong Moiré tilting of measuring graduation and scanning unit. This is important, especially when the incremental signals are to be processed further such as possibly interpolated.

The position-measuring device may have a reference marking with a plurality of structure elements, which are disposed in mirror-symmetry with an axis of symmetry that has a perpendicular orientation with respect to the measuring direction in the measuring-graduation plane.

The structure elements of the reference marking may be arranged in mirror symmetry with an axis of symmetry extending in parallel to the measuring direction in the measuring-graduation plane.

Via the first scanning device in the scanning unit for generating the reference-pulse signal, the reference marking on the measuring graduation may be acted upon once in a reference-pulse scanning field.

The centers of the two incremental-signal scanning fields and the center of the reference-pulse scanning field are located, for example, on a straight line in the measuring-graduation plane, this line being oriented perpendicular to the measuring direction.

As an alternative, the centers of the two incremental-signal scanning fields may be located on a straight line in the measuring-graduation plane, this line being oriented perpendicular to the measuring direction. In the measuring direction, the center of the reference-pulse scanning field is disposed on the measuring graduation at an offset with respect to this straight line.

At the reference position the reference marking may include:
- at least one set of first structure elements, which are disposed in the plane of the measuring graduation, perpendicular to the measuring direction, periodically with a first transversal periodicity, and
- at least one set of second structure elements, which are disposed in the plane of the measuring graduation, perpendicular to the measuring direction, periodically with a second transversal periodicity, the first and the second transversal periodicity differing from each other, and
- the structure elements are designed as diffractive structure elements which, in the measuring direction, optically act like a cylinder lens having a specific focal length and, perpendicular to the measuring direction, act like a deflection grating with the first or second transversal periodicity, and
- the structure elements having a virtual or real focal point at the focal-length distance from the reflection-measuring graduation in the measuring direction.

The first scanning device in the scanning unit for generating the reference-pulse signal may include:
- a plurality of optical elements, among them at least one imaging optics, as well as at least two diaphragm structures, which are arranged in a diaphragm plane and have a plurality of diaphragm openings in each case, as well as
- at least two reference-pulse detector elements.

The imaging optics in the scanning unit is dimensioned such that imaging of the image-side focal plane of the structure elements into the focal plane is brought about thereby, the positional arrangement of the diaphragm openings of the two diaphragm structures in the measuring direction being adapted to the arrangement of the structure elements of the reference marking.

Furthermore, the scanning unit may include a scanning plate on which the diaphragm structures and the imaging optics are arranged.

In addition, the two scanning devices in the scanning unit for generating the incremental signals may include:
- a plurality of optical elements, among them a plurality of scanning gratings, at least one combination grating, as well as at least two reflector elements via which a back reflection of the beams coming from a first incremental-signal scanning field into a second incremental-signal scanning field is implemented, and
- a plurality of incremental-signal detector elements.

The scanning unit includes a scanning plate on which the scanning gratings, the combination grating and the reflector elements are disposed.

Furthermore, a light source, which supplies the first and second scanning devices with light for scanning the incremental graduations and the reference marking, may be assigned to the scanning unit, and the scanning unit also may include a splitting grating by which the beams coming from the light source are split up into a first beam component for the first scanning device for generating the reference-pulse signals, and into a second beam component for the second scanning device for generating the incremental signals.

The splitting grating is configured such that convergent illumination of the reference marking on the reflection-measuring graduation occurs.

The splitting grating may be arranged on the side of the scanning plate facing the measuring graduation.

According to an example embodiment of the present invention, a position-measuring device for the generation of incremental signals and a reference-pulse signal at least one reference position includes a scanning unit as well as a measuring graduation, which is displaceable thereto in at least one measuring direction. The measuring graduation includes two reference-marking tracks, which extend in parallel in the measuring direction and which each have a reference marking at least one reference position arranged in symmetry with respect to an axis of symmetry in the measuring direction. An incremental scale-graduation track having a periodic incremental graduation is arranged between the reference-marking tracks. The scanning unit includes a first scanning device for generating the reference-pulse signal. To generate the reference-pulse signal, a scanning beam acts at least once upon the reference markings in the reference-marking tracks in a reference-pulse signal scanning field. Furthermore, a second scanning device is provided in the scanning unit for generating the incremental signals. To generate the incremental signals, a scanning beam acts at least once upon the incremental graduation in two incremental-signal scanning fields.

Like the above-described position-measuring device, the arrangement of the position-measuring device provides that a reference-pulse signal having a width that corresponds to the width of the incremental signals is able to be generated thereby. This increases the reliability of the position-measuring devices.

The reference markings may be arranged in mirror symmetry with an axis of symmetry that is oriented perpendicular to the measuring direction in the measuring-graduation plane.

The centers of the two incremental-signal scanning fields may be located on a straight line in the measuring-graduation plane, the line being oriented perpendicular to the measuring direction, and the centers of the reference-pulse scanning fields may be located on a second straight line in the measuring-graduation plane, the line being oriented perpendicular to the measuring direction, the two straight lines being disposed on the measuring graduation at a mutual offset in the measuring direction.

The reference markings may be formed on the measuring graduation as individual cylinder lenses having a transversal periodicity, so that the two first orders of diffraction strike a scanning plate in the scanning unit in a spatially separate manner from the illuminated scanning beam.

The first scanning device in the scanning unit for generating the reference-pulse signals may include a plurality of optical elements, among them a plurality of scanning gratings and reflector elements, via which the beams coming from a first reference-pulse scanning field of the first reference-marking track are reflected back into a second reference-pulse scanning field of the second reference-marking track. Furthermore, the first scanning device includes one or a plurality of reference-pulse detector elements(s).

The scanning unit may have a scanning plate where several diffractive scanning gratings are arranged on the side facing the measuring graduation, and a retro-reflecting roof prism, which is equipped with a plurality of mirrored areas as reflector elements, is arranged on the opposite side.

The second scanning device in the scanning unit for generating the incremental signals may include a plurality of optical elements, among them a plurality of scanning gratings, an optional combination grating, as well as at least two reflector elements. In addition, the second scanning device includes a plurality of incremental-signal detector elements.

Using the reflector elements, the beams coming from a first incremental-signal scanning field may be reflected back into a second incremental-signal scanning field.

The scanning unit may also include a scanning plate, where a plurality of diffractive scanning gratings as well as an optional combination grating are arranged on the side facing the measuring graduation, and a retro-reflecting roof prism, which is equipped with a plurality of mirrored areas as reflector elements, is arranged on the opposite side.

In addition, a light source, which supplies the first and second scanning devices with light for scanning the incremental graduation and the reference markings, may be assigned to the scanning unit.

Further features and aspects of example embodiments of the present invention are described in more detail below with reference to the appended Figures.

BRIEF DESCRIPTION OF THE DRAWINGS

FIG. 2a is a partial top view of the reflection-measuring graduation of the position-measuring device, which includes an enlarged view of the reference marking.

FIG. 4b illustrates the sum and difference signals produced from the signals according to FIG. 4a, including the trigger thresholds utilized for the generation of the reference-pulse signal.

FIG. 9a is a schematic view of paths of scanning-beam components of a position-measuring device according to an example embodiment of the present invention, to describe the signal generation.

FIG. 9b is a schematic view of paths of scanning-beam components of the position-measuring device invention, to describe the signal generation.

FIG. 10 is a partial top view of the reflection-measuring graduation of the position-measuring device, which includes the scanning fields in the reference-marking tracks and in the incremental-graduation track.

FIG. 11 is a plan view of the underside of the scanning plate of the position-measuring device.

DETAILED DESCRIPTION

A position-measuring device according to an example embodiment of the present invention and, in particular, the generation of a reference-pulse signal RI with the aid of this device are described below with reference to FIGS. 1 to 8b.

Figure 1A:
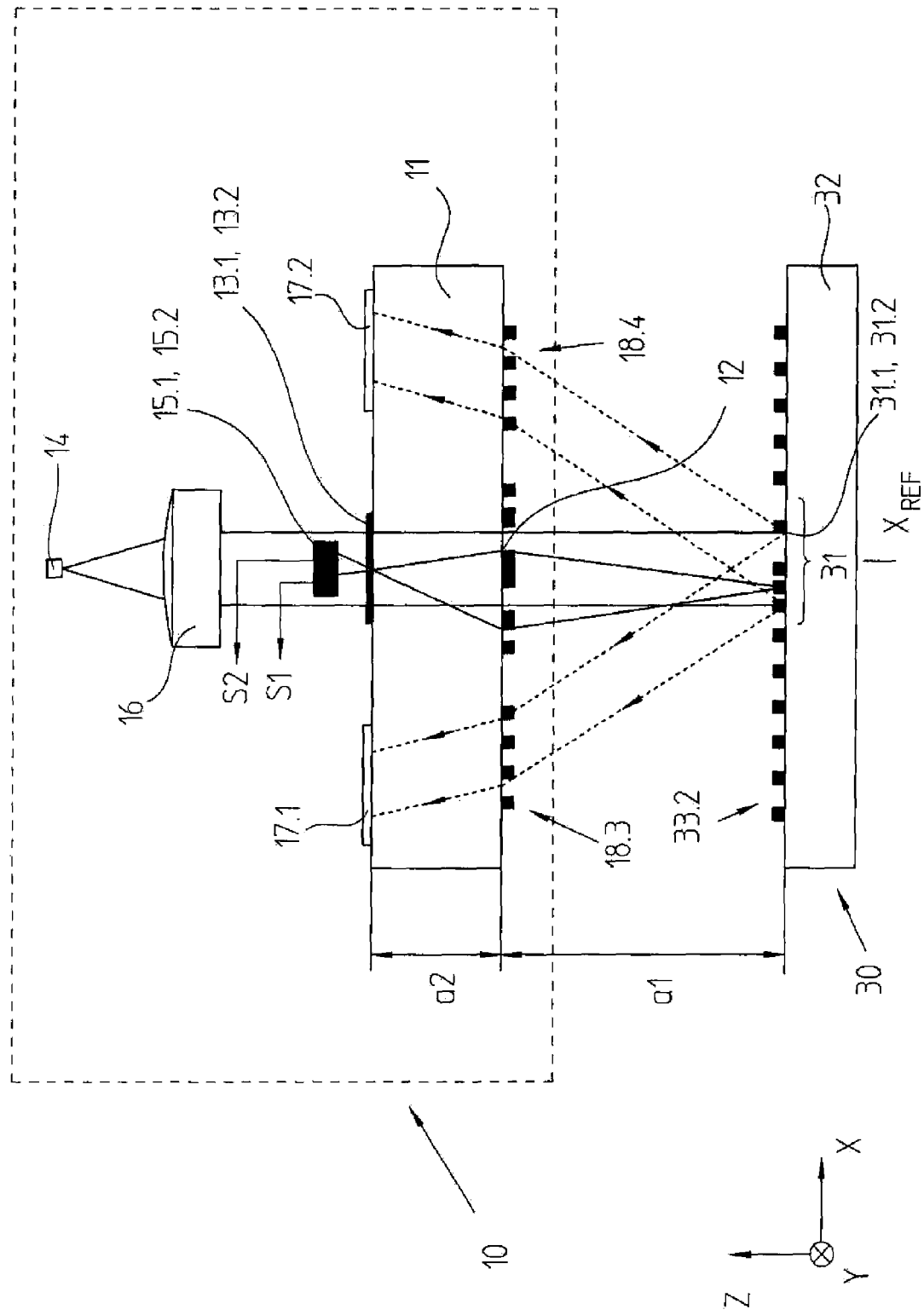
FIG. 1a is a schematic view of paths of scanning-beam components of a position-measuring device according to an example embodiment of the present invention, to describe the generation of reference-pulse signals.
Figure 1B:
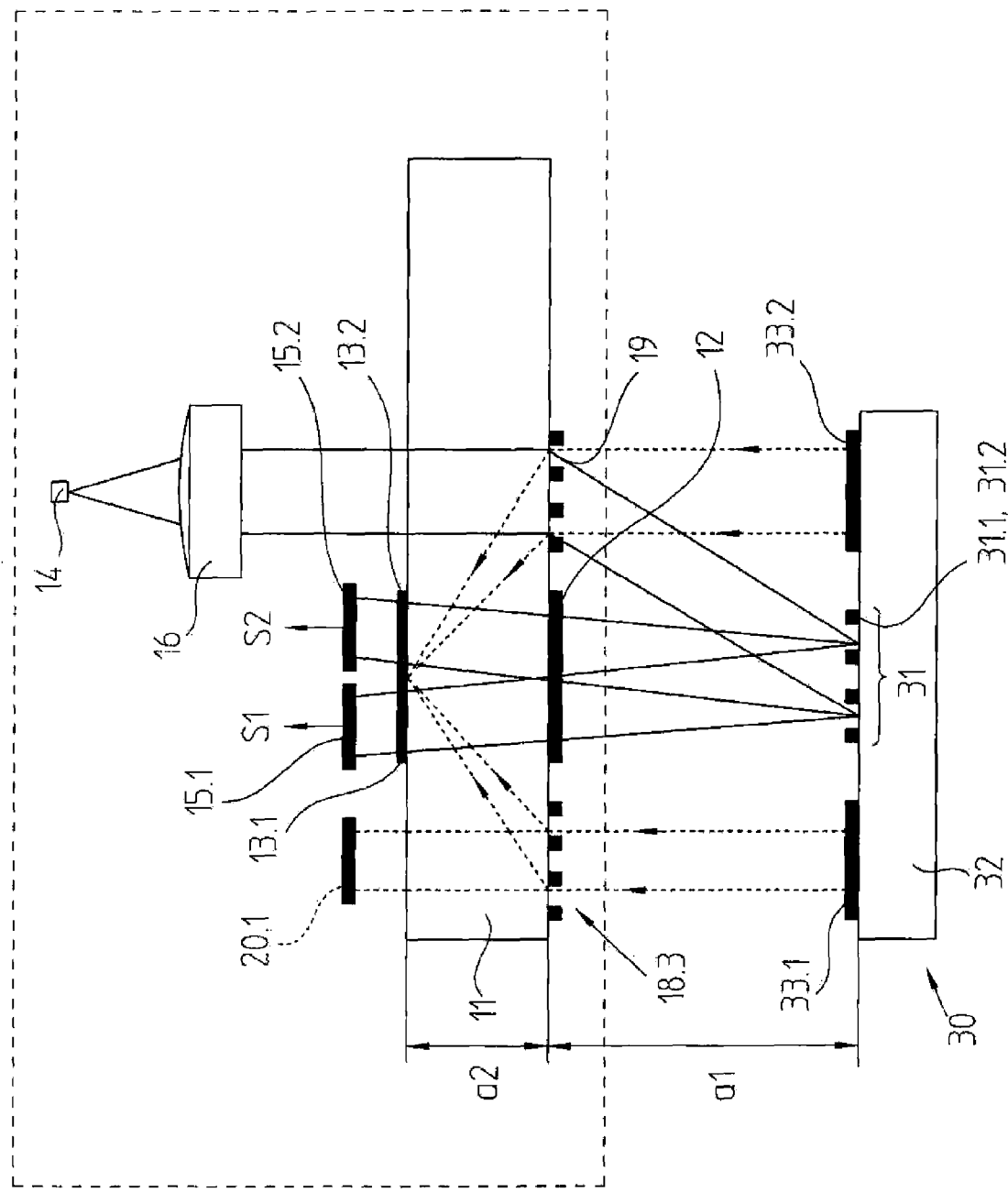
FIG. 1b is a schematic view of paths of scanning beams of the position-measuring device to describe the generation of reference-pulse signals.
Figure 1C:
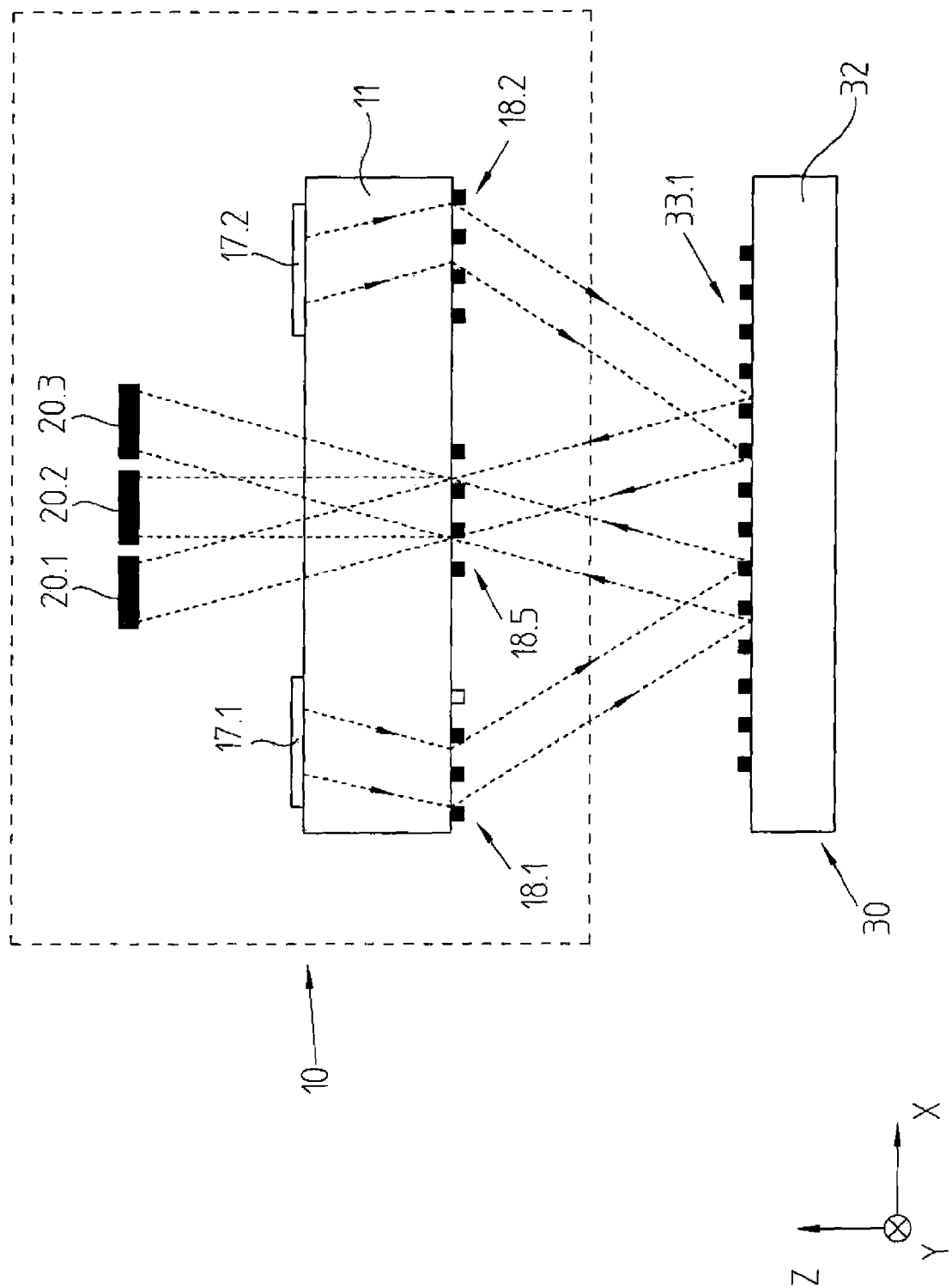
FIG. 1c is a schematic view of paths of scanning beam components of the position-measuring device to describe the generation of incremental signals.

In highly schematic form and in different views, FIGS. 1a and 1b illustrate paths of scanning-beam components for the generation of reference-pulse signals in a position-measuring device. FIG. 1c shows schematic paths of scanning-beam components for the generation of the incremental signals in the position-measuring device.

In FIGS. 1a to 1c and also in the following corresponding figures in connection with alternative example embodiments, the paths of the scanning-beam components for the generation of reference-pulse signals are indicated by solid lines in each case, while the paths of the scanning-beam components for the generation of the incremental signals are indicated by dashed lines.

The illustrated optical position-measuring device includes a measuring graduation arranged as reflection-measuring graduation 30, and also a scanning unit 10, which is displaceable thereto in at least one measuring direction x. Reflection-measuring graduation 30 and scanning unit 10 are connected to two objects such as machine components, which are displaceable relative to one another. Position signals relating to the position of the two objects displaceable relative to one another are generated via the position-measuring device and forwarded to a control unit. The control unit utilizes the positional data, e.g., in a conventional manner for control purposes. The position-measuring device may be configured for linear as well as rotary displacement movements.

As described below, the position-measuring device provides not only periodic incremental signals $INC_A$, $INC_B$ but also a reference-pulse signal RI at least one known reference position $X_{REF}$ along the measuring path. The incremental measurement, which has a considerably higher resolution, may be related in the usual manner to the known absolute position determined in this manner.

For this purpose, scanning unit 10 includes a first scanning device for generating reference-pulse signal RI, as well as a second scanning device for generating the incremental signals $INC_A$, $INC_B$.

First, the generation of reference-pulse signal RI with the aid of the first scanning device is described on the basis of the paths of scanning-beam components provided for this purpose.

In addition to one or a plurality of periodic incremental-graduation tracks having incremental graduation (s) 33.1, 33.2 and extending in measuring direction x, the measuring graduation arranged as reflection-measuring graduation 30 also includes at least one reference-marking track having a reference marking 31 at a defined reference position $X_{REF}$. In general, it is also possible to place a plurality of reference markings at different reference positions, for example, in the form of so-called distance-coded reference markings, etc.

As can be gathered from the view of a section of reflection-measuring graduation 30 illustrated in FIG. 2a, in this variant two parallel, identical incremental graduations 33.1, 33.2 are arranged on a carrier body 32 for the purpose of generating incremental signals $INC_A$, $INC_B$. The two incremental graduations 33.1, 33.2 include linear graduation regions, which have different optical characteristics and are disposed periodically with graduation period $TP_{INC}$ in measuring direction x. Reflection-measuring graduation 30 may be incident-light phase gratings, for example, which include alternating partial regions having different phase-shifting effects on the reflected beams. $TP_{INC}=0.5$ µm may be selected. The graduation regions extend perpendicular to measuring direction x, i.e., in the indicated y-direction (also referred to as line direction in the following text), in the plane of reflection-measuring graduation 30.

The position-measuring device may also include a measuring graduation in the form of a transmitted-light measuring graduation, which, for example, has graduation regions that are arranged in alternation and have different transmission characteristics.

At reference position $X_{REF}$, a reference marking 31 is provided in the reference-marking track between the two tracks for incremental graduations 33.1, 33.2. Like incremental graduations 33.1, 33.2, reference marking 31 includes a specific arrangement of graduation regions or structure elements 31.1, 31.2 having different reflective properties.

A light source 14, such as a laser diode, as well as collimation optics 16, a plurality of reference-pulse detector elements 15.1, 15.2 for generating the reference-pulse signals, a plurality of incremental-signal detector elements 20.1, 20.2, 20.3 for generating the incremental signals (FIG. 1c), and also various additional optical elements are provided on the side of scanning unit 10. The different optical elements for generating the reference-pulse signals and incremental signals RI, $INC_A$, $INC_B$, respectively, are arranged on a scanning plate 11 in scanning unit 10 and are described in more detail below.

Part of the first scanning device for generating reference-pulse signal RI are various optical elements in scanning unit 10 or elements assigned to the scanning unit, among them at least the imaging optics 12 as well as diaphragm structures 13.1, 13.2, which are disposed in the diaphragm plane and have a plurality of individual diaphragm openings. Furthermore, reference-pulse detector elements 15.1, 15.2 are to be considered part of the first scanning device.

Light source 14, collimation optics 16 and various detector elements 15.1, 15.2, 20.1, 20.2, 20.3 need not necessarily be arranged inside scanning unit 10 or in a housing thereof. In certain variants, for example, it is possible to assign these components to scanning unit 10, e.g., in a conventional manner, via optical waveguides, and to arranged the different elements in separate locations outside of scanning unit 10.

A splitting grating 16 splits up the beam, which has a parallel orientation downstream from collimation optics 16, into a scanning beam path for generating reference-pulse signal RI (solid boundary lines in FIGS. 1a to 1c), and into a scanning-beam path for generating incremental signals $INC_A$, $INC_B$ (dashed boundary lines in FIGS. 1a to 1c). As can be gathered from FIG. 1b, this: means that the beam component split off for the generation of the reference-pulse signal is deflected into the region between the two incremental graduations 33.1, 33.2 on reflection-measuring graduation 30. The grating constant of splitting grating 19 may be selected such that, given the standard scanning clearance between scanning unit 10 and reflection-measuring graduation 30, a region precisely in the center between the two incremental graduations 33.1, 33.2 will be illuminated. From this region a back-reflection in the direction of scanning unit 10 takes place. In scanning unit 10, the back-reflected beam components fall on an imaging optics 12, which is arranged on the underside of scanning plate 11. Imaging optics 12 may be provided on scanning plate 11 in different forms, for example, in the form of a single Fresnel lens. As an alternative, imaging optics 12 may also be arranged as lens array including a plurality of individual lenses. This is discussed in greater detail below.

Placing reference marking 31 between the two incremental graduations 33.1, 33.2 provides that possible tilting about the z-axis of reflection-measuring graduation 30 and scanning unit 10 (Moiré tilt) will not cause any (falsifying) change in the position of reference-pulse signal RI relative to incremental signals $INC_A$, $INC_B$. In addition, relatively little space is required to provide the corresponding device.

Imaging optics 12 is optically dimensioned such that its image-side focal plane coincides with the top surface of scanning plate 11 or a diaphragm plane situated there, in which two diaphragm structures 13.1, 13.2 are disposed each of which has a plurality of diaphragm openings. Arranged downstream from diaphragm structures 13.1, 13.2 in scanning unit 10 are two reference-pulse detector elements 15.1, 15.2, which are used to detect the light transmitted through the diaphragm openings, and thus to generate reference-pulse signal RI utilizing signals S1, S2. On the object-side, the focus imaged by imaging optics 12 is located at the level of one half of the distance between the neutral point of rotation and the surface of reflection-measuring graduation 30. That means that imaging optics 12, on the object-side, is adapted to a plane, or to a point, that results from the position of the system-controlled neutral point of rotation. The neutral point of rotation in this context is the point about which scanning unit 10 or reflection-measuring graduation 30 may tilt without causing errors in the position determination, i.e., errors in the generation of reference-pulse signal RI or incremental signals $INC_A$, $INC_B$. Depending on the system realities, the neutral point of rotation may come to lie in different planes, i.e., both in the measuring-graduation plane as well as below or above the measuring-graduation plane.

Important for the generation of reference-pulse signal RI is the selected arrangement of reference marking 31 on the side of reflection-measuring graduation 30. Its arrangement is responsible for the reliable detection of a reference-pulse signal RI at reference position $X_{REF}$. For a more detailed discussion of reference marking 31 reference is made to FIG. 2a, in particular, which is a top view of reflection-measuring graduation 30 in the region of reference position $X_{REF}$.

In the region of reference position $X_{REF}$ between the two incremental graduations 33.1, 33.2, reference marking 31 has a first set of structure elements 31.1 as well as a second set of structure elements 31.2 in specific geometric arrangements. Structure elements 31.1, 31.2 of both sets are arranged in the plane of reflection-measuring graduation 30, perpendicular to measuring direction x, periodically with a first transversal periodicity T1 and a second transversal periodicity T2, respectively. Transversal periodicities T1, T2 of the two sets of first and second structure elements 31.1, 31.2 differ from one another, as can also be gathered from FIG. 2a. For example, T1=2.4 µm, and T2=2.0 µm may be selected.

As illustrated in FIG. 2a, reference marking 31 includes a total of four separate sets of first structure elements 31.1 and four separate sets of second structure elements 31.2, which are arranged in parallel next to each other in measuring direction x. That is to say, a total of eight sets of structure elements 31.1, 31.2 is provided in measuring direction x. In measuring direction x, the four sets of first and second structure elements 31.1, 31.2 are arranged in mirror symmetry with an axis of symmetry S that is oriented perpendicular with respect to measuring direction x in the plane of reflection-measuring graduation 30. In the example at hand, axis of symmetry S is located precisely at reference position $X_{Ref}$. Structure elements 31.1, 31.2 having different transversal periodicities T1, T2 are located opposite one another, in mirror symmetry with respect to axis of symmetry S.

As can be gathered from the enlarged view of reference marking 31 in FIG. 2a, each structure element 31.1, 31.2 in this example has a cross-sectional form that includes two straight boundary lines extending in parallel in transversal direction y, and two parallel boundary lines that curve in longitudinal extension direction x. The optical effect of these elements, which will be discussed in more detail below, is the result of the selected cross-sectional form. Furthermore, sets having first and second structure elements 31.1, 31.2 differ by different transversal periodicities T1, T2 at which the individual structure elements 31.1, 31.2 are periodically arranged in the y-direction.

If the beam components used for the generation of reference-pulse signal RI and arriving from splitting grating 19 of scanning unit 10 fall onto the region of reference marking 31 having the sets of first and second structure elements 31.1, 31.2, the beam components are also deflected to varying degrees in the y-direction in the y-z plane, due to the different transversal periodicities T1 and T2 of the different sets. The particular deflection angle is usually a direct function of the individual transversal periodicity T1, T2. Via imaging optics 12 in scanning unit 10, the back-reflected beam components are imaged from the region of reference marking 31 into the diaphragm plane. With respect to the geometric arrangement of the plurality of diaphragm openings, the two diaphragm structures 13.1, 13.2 arranged there are adapted to the geometric arrangement of the sets of first and second structure elements 31.1, 31.2 of reference marking 31. This means that the openings of a first diaphragm structure 13.1 are adapted to the arrangement of the sets of first structure elements 31.1, and the openings of a second diaphragm structure 13.2 are adapted to the arrangement of the sets of second structure elements 31.2. This can be gathered from the comparison of FIGS. 2a and 3b. For example, four sets of first structure elements 31.1 are provided in the reference marking according to the illustrated example in FIG. 2a, to which first diaphragm structure 13.1, adapted thereto, with the four illustrated diaphragm openings is assigned. Analogously, the four sets of second diaphragm structure elements 31.2 are assigned the four diaphragm openings, adapted thereto, of second diaphragm structure 13.2. It is also possible to select a different number of diaphragm openings and sets of structure elements. When selecting the positions of the diaphragm openings, imaging scale m resulting from imaging optics 12 should be taken into account as well.

Such an adaptation has the result that in the region adjacent to reference position $X_{REF}$, the two reference-pulse detector elements 15.1, 15.2 downstream from diaphragm structures 13.1, 13.2 are able to detect a signal maximum of signals S1, S2 detected with the aid of these elements.

As mentioned above, the imaging optics may alternatively also be arranged as lens array having a plurality of individual lenses. Longer sets of structure elements in line direction y are able to be imaged into the diaphragm plane in this manner. This provides advantages with respect to the signal strength of the detected signals. In such a case, a partial sequence of a set of structure elements is imaged by an individual lens. In this variant, one diaphragm opening of diaphragm structure 13.1, 13.2 is assigned to each set of structure elements 31.1, 31.2. The positions of the diaphragm openings result in coordinated fashion from the imaging of the sets of structure elements 31.1, 31.2 via imaging optics 12 at imaging scale m.

Figure 2B:
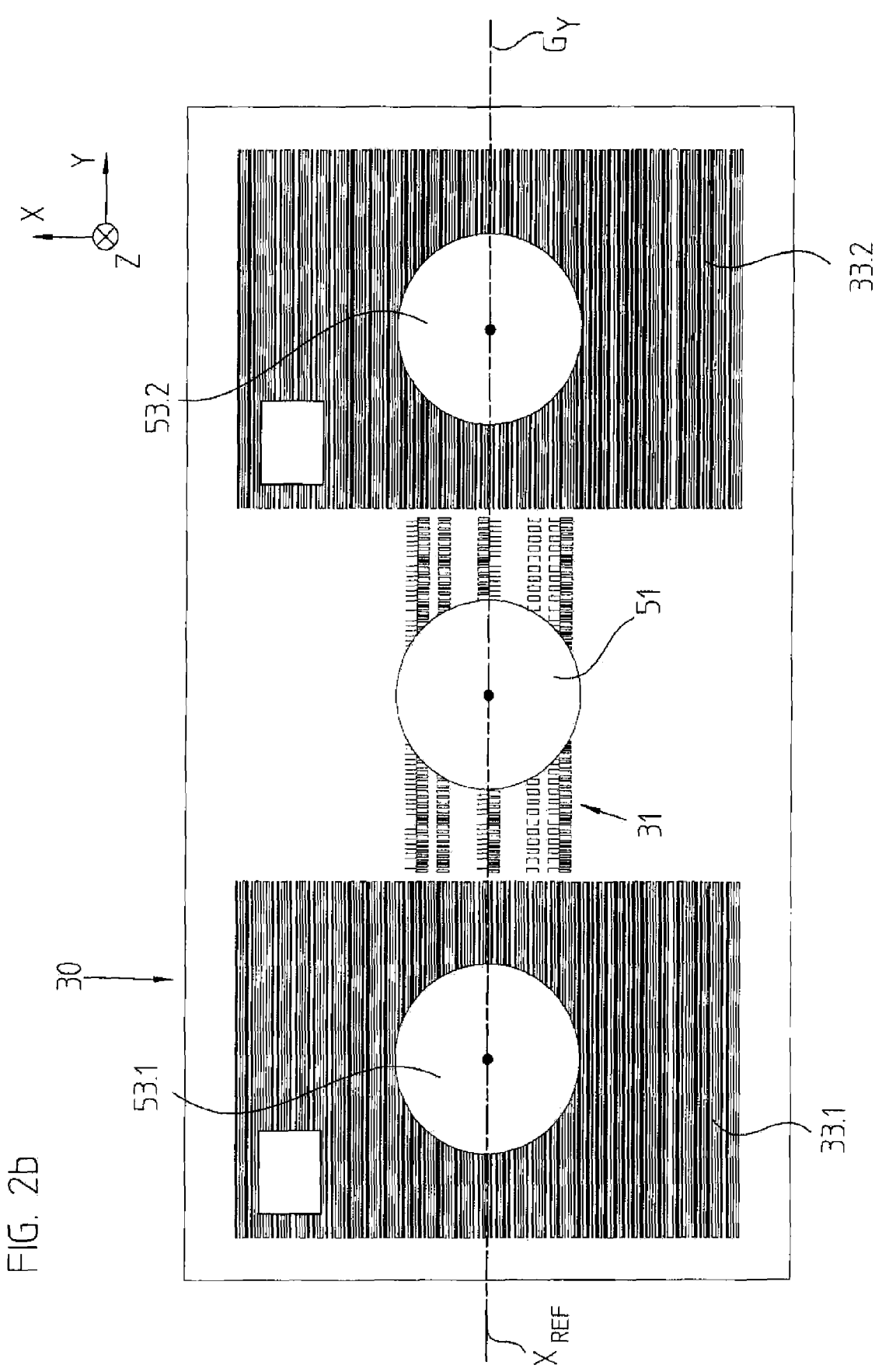
FIG. 2b is a partial top view of the reflection-measuring graduation of the position-measuring device, which includes the scanning fields in the reference-marking track and in the incremental-graduation tracks.

FIG. 2b is another top view of reflection-measuring graduation 30 of the position-measuring device, in the region of reference position $X_{REF}$. Supplementing the illustration of FIG. 2a, the two incremental-signal scanning fields 53.1, 53.2 are illustrated in the two incremental graduations 33.1, 33.2 in FIG. 2b, each of which is acted upon once by a scanning beam to generate incremental signals $INC_A$, $INC_B$. Also illustrated in FIG. 2b is reference-pulse scanning field 51 in the region of the reference marking, which is acted upon once by a scanning beam with the aid of the first scanning device to generate reference-pulse signal RI.

In this example, as can be gathered from FIG. 2b, the centers of the two incremental-signal scanning fields 53.1, 53.2 and reference-pulse scanning field 51 are located on a straight line $G_Y$ in the measuring-graduation plane, the line being oriented perpendicular to measuring direction x. The position of the various scanning fields 51, 53.1, 53.2 on reflection-measuring graduation 30 is suitably adjusted by the corresponding arrangement of the first and second scanning devices.

Due to reference-pulse scanning field 51 that is disposed between the two incremental-signal scanning fields 33.1, 33.2, the desired immunity of the system in the event of possible Moiré tilting of measuring graduation 30 and scanning unit 10 is able to be achieved.

Figure 2C:
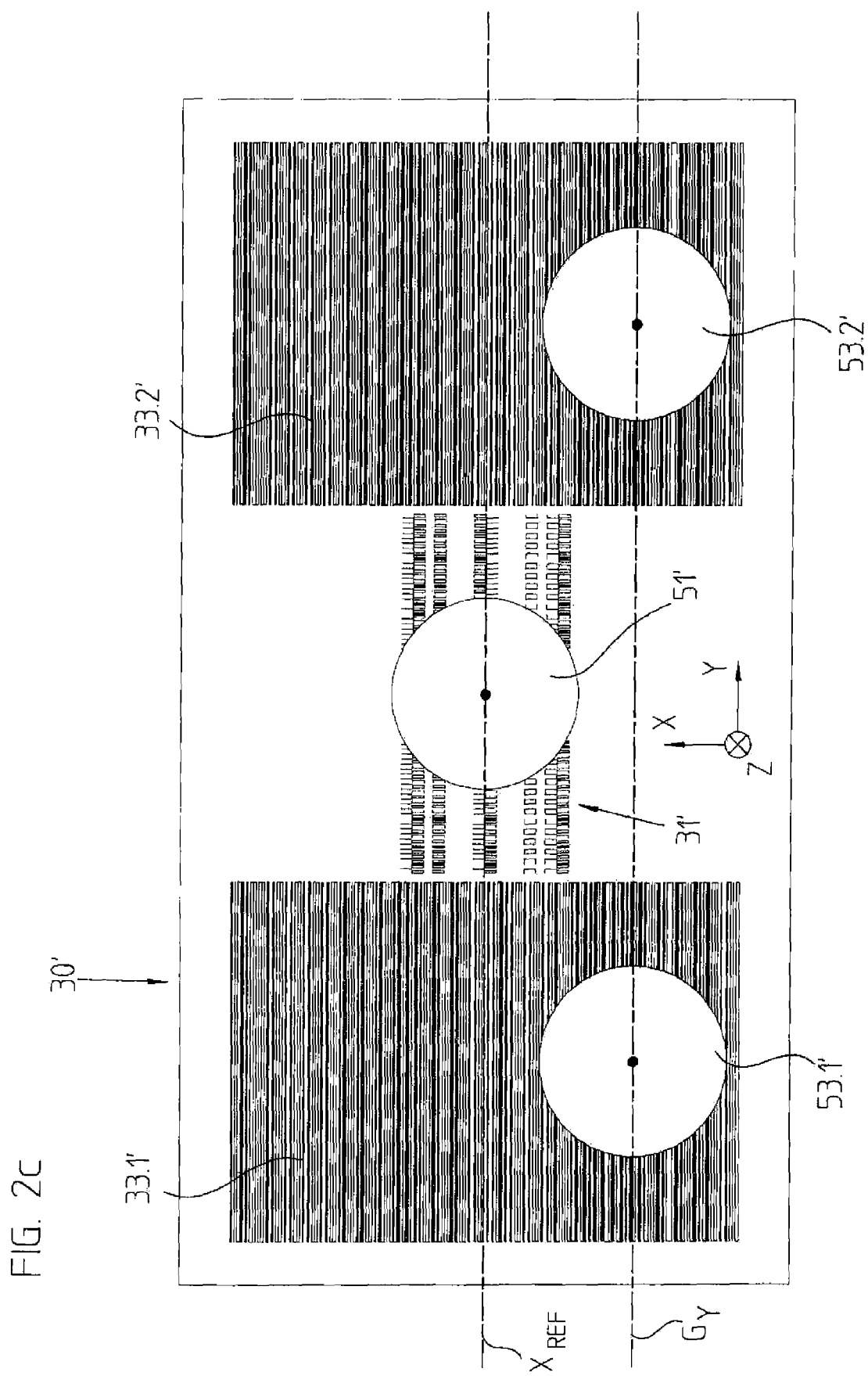
FIG. 2c is a partial top view of the reflection-measuring graduation of a variant of the position-measuring device, which includes the scanning fields in the reference-marking track and in the incremental-graduation tracks.

A variant that is slightly modified in comparison and has different positions of the various scanning fields 51', 53.1', 53.2' is illustrated in FIG. 2c. The first and second scanning devices are arranged such that the centers of the two incremental-signal scanning fields 53.1', 53.2' on reflection-measuring graduation 30' are located on a straight line $G_Y'$ in the measuring-graduation plane, the line being oriented perpendicular to measuring direction x. However, the center of reference-pulse signal scanning field 51' is disposed at an offset thereto in measuring direction x. This variant allows the position of reference-pulse signal RI to remain relatively independent of the particular Moiré angle if Moiré tilting about the z-axis of the measuring graduation and scanning unit 10 occurs. Furthermore, due to the offset scanning fields, this variant is able to minimize undesired crosstalk of interference on the incremental-graduation track.

Figure 4A:
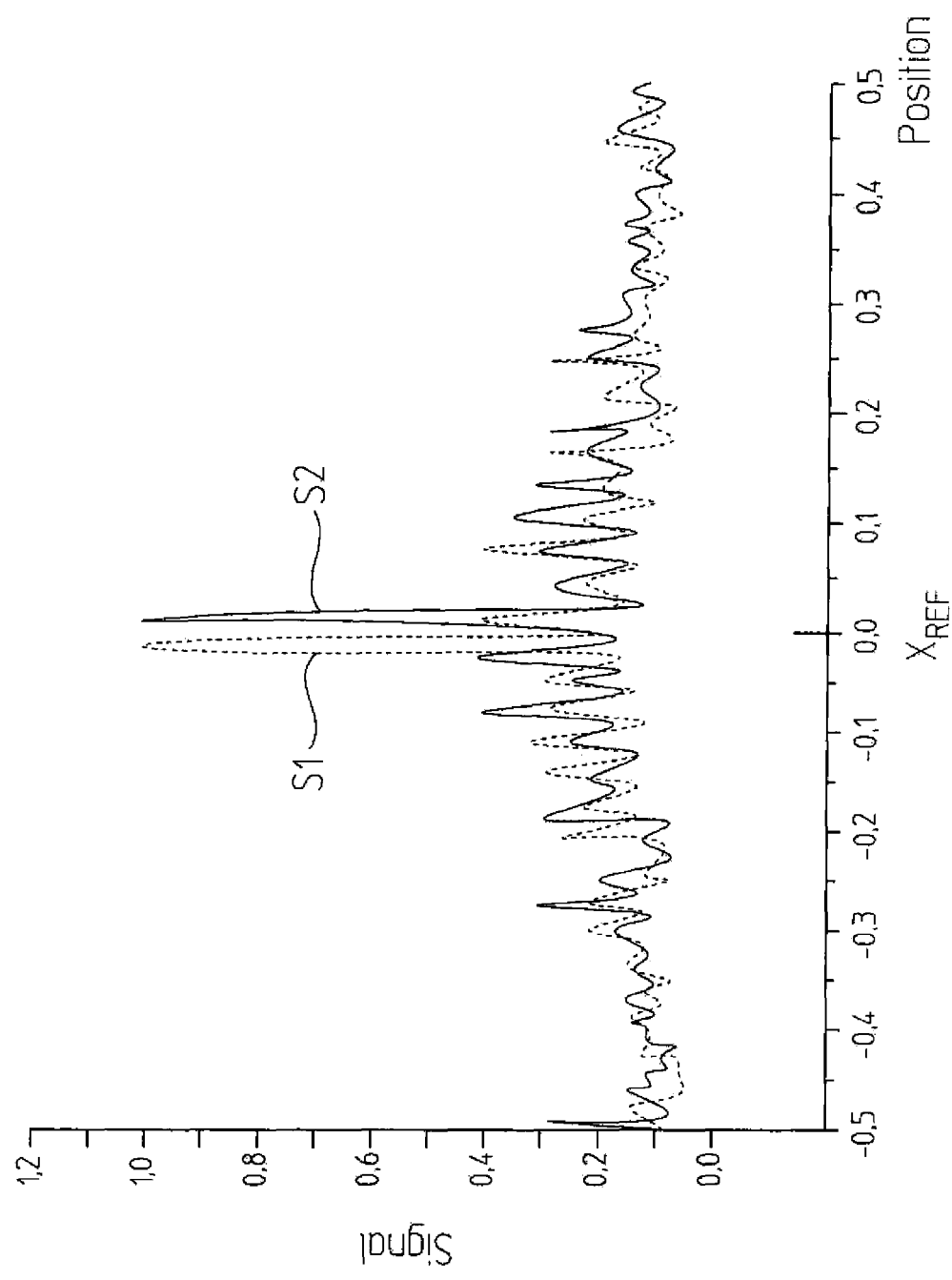
FIG. 4a illustrates resulting signals for the generation of reference pulses by the position-measuring device.

Signals S1, S2 applied at reference-pulse detector elements 15.1, 1.5.2 in the region around reference position $X_{REF}$ are illustrated in FIG. 4a. The manner in which reference-pulse signal RI of interest here can ultimately be generated from these signals S1, S2 is explained in greater detail below.

For the generation of incremental signals $INC_A$, $INC_B$ with the aid of the second scanning device, reference is made to FIGS. 1a, 1b and 2, in which the partial paths of scanning-beam components for the generation of the incremental signals are indicated by a dashed line in each case.

In the process, the beams emitted by light source 14 for the generation of incremental signals, having passed through splitting grating 19 without deflection, fall onto incremental graduation 33.2 on reflection-measuring graduation 32. From there, the beam components, split up in the x-z plane, are reflected back in the direction of scanning unit 10, where they pass through scanning gratings 18.3, 18.4 disposed on the underside of scanning plate 11 (FIG. 1a). These deflect the beam components in the y-direction, so that the beam components strike two reflector elements 17.1, 17.2 on the top surface of scanning plate 11 (FIG. 1*b*). Reflector elements 17.1, 17.2 reflect the two beam components back in the direction of additional scanning gratings 18.1, 18.2 on the underside of scanning plate 11, which deflect the beam components back in the direction of second incremental graduation 33.1 on reflection-measuring graduation 30 (FIG. 2). Another back-reflection of the beam components in the direction of scanning unit 10 takes place from incremental graduation 33. There, the two back-reflected beam components fall on a combination grating 18.5 on the underside of scanning plate 11. Three pairs of interfering beam components ultimately propagate from combination grating 18.5 in the direction of three downstream incremental-signal detector elements 20.1, 20.2, 20.3, which detect three periodic signals that are phase-shifted by 120° in each case and modulated as a function of the shift. In a conventional manner, e.g., these are converted into two incremental signals $INC_A$, $INC_B$ phase-shifted by 90°, via a downstream electronics system. With regard to incremental scanning, reference is made to German Patent Application No. 10 2006 042 743, which is expressly incorporated herein in its entirety by reference thereto.

Part of the second scanning device for generating incremental signals $INC_A$, $INC_B$ are various optical elements in scanning unit 10 or elements assigned to scanning unit 10, among them at least several scanning gratings 18.1 to 18.4, at least one combination grating 18.5, as well as at least two reflector elements 17.1, 17.2. Furthermore, incremental-signal detector elements 20.1, 20.2, 20.3 are also part of the second scanning device.

Figure 3A:
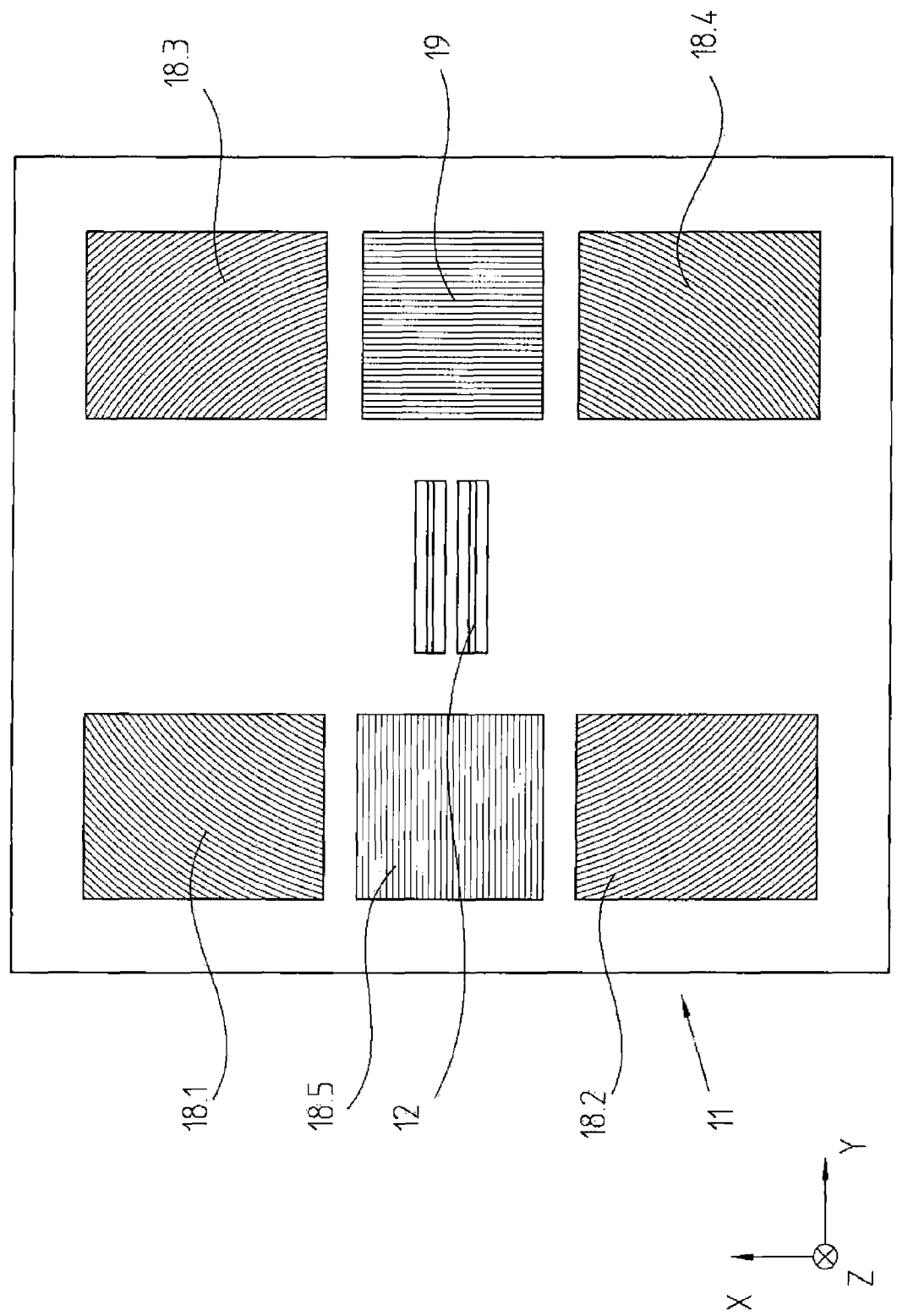
FIG. 3a is a plan view of the underside of the scanning plate of the position-measuring device.
Figure 3B:
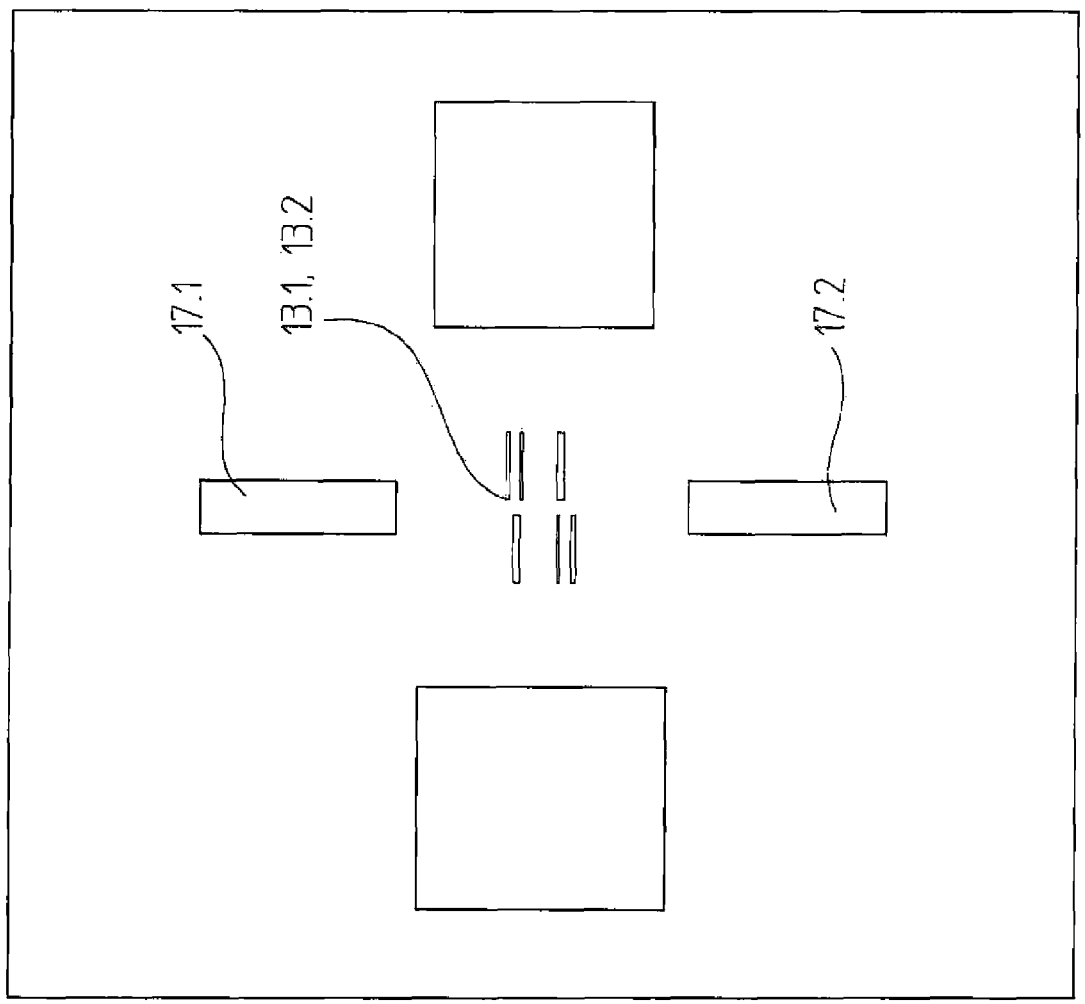
FIG. 3b is a top view of the top surface of the scanning plate of the position-measuring device.

FIGS. 3*a* and 3*b* illustrate the placement of the various optical elements for generating reference-pulse signal RI as well as incremental signals $INC_A$, $INC_B$ on the top surface and underside of scanning plate 11.

As mentioned above, signals S1, S2 are generated in the region of reference-pulse position $X_{REF}$ via reference-pulse detector elements 15.1, 15.2, as illustrated in FIG. 4*a*. However, the width of signals S1, S2 at approximately 15 μm is not sufficiently narrow enough for a reference-pulse signal RI, e.g., when using high-resolution incremental signals $INC_A$, $INC_B$ having signal periods of 0.5 μm, for example, as described above. As a rule, it is desirable in this context to have available on the output side a reference-pulse signal RI that has a width that corresponds to the width of generated incremental signals $INC_A$, $INC_B$ in the region of reference position $X_{REF}$. For this reason, exemplary embodiments provide further processing of signals S1, S2 via the circuit system illustrated in FIG. 5, which is further described below.

Figure 4C:
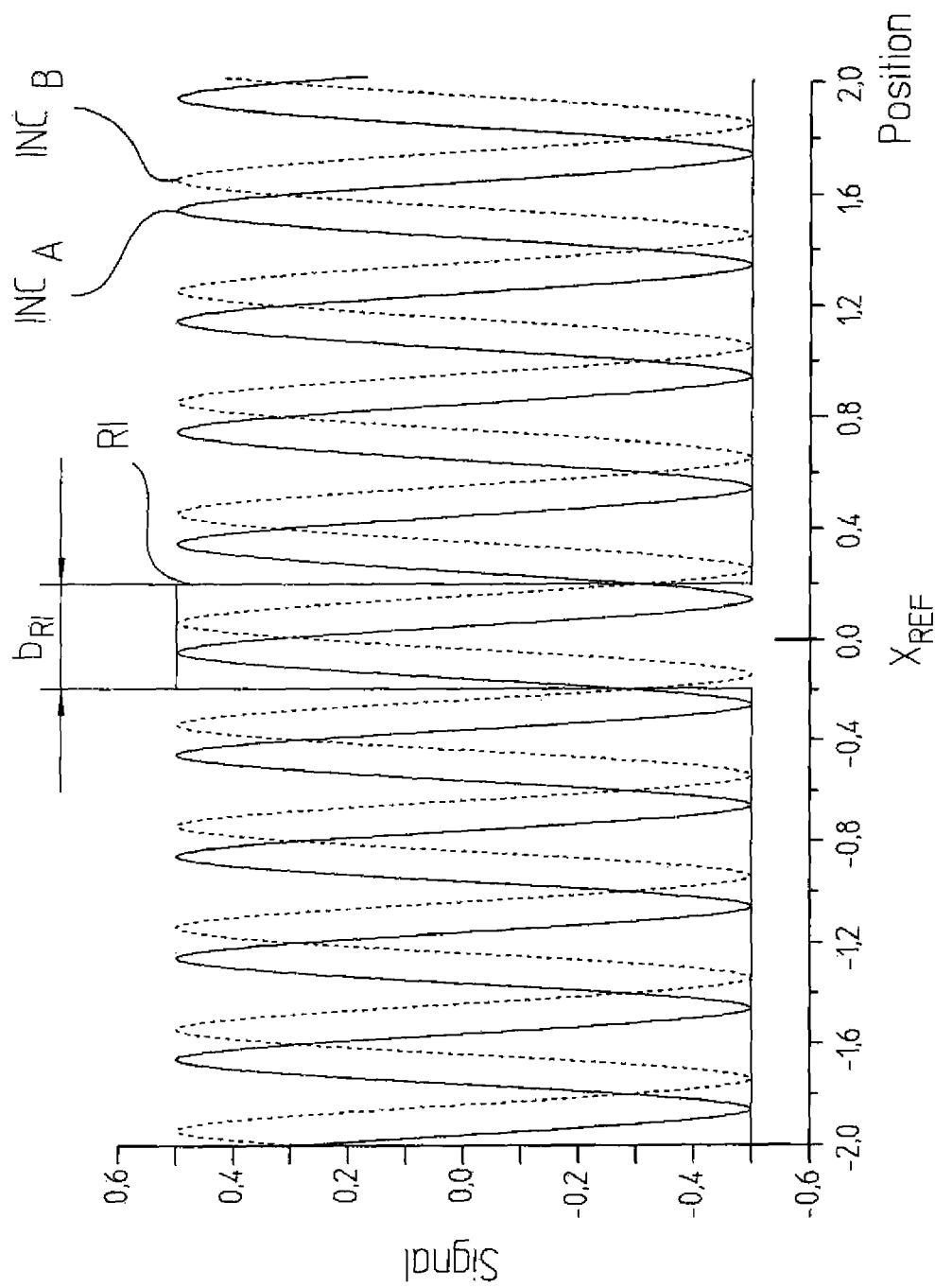
FIG. 4c illustrates the resulting reference-pulse signal at the reference position, including an illustration of the incremental signals.
Figure 5:
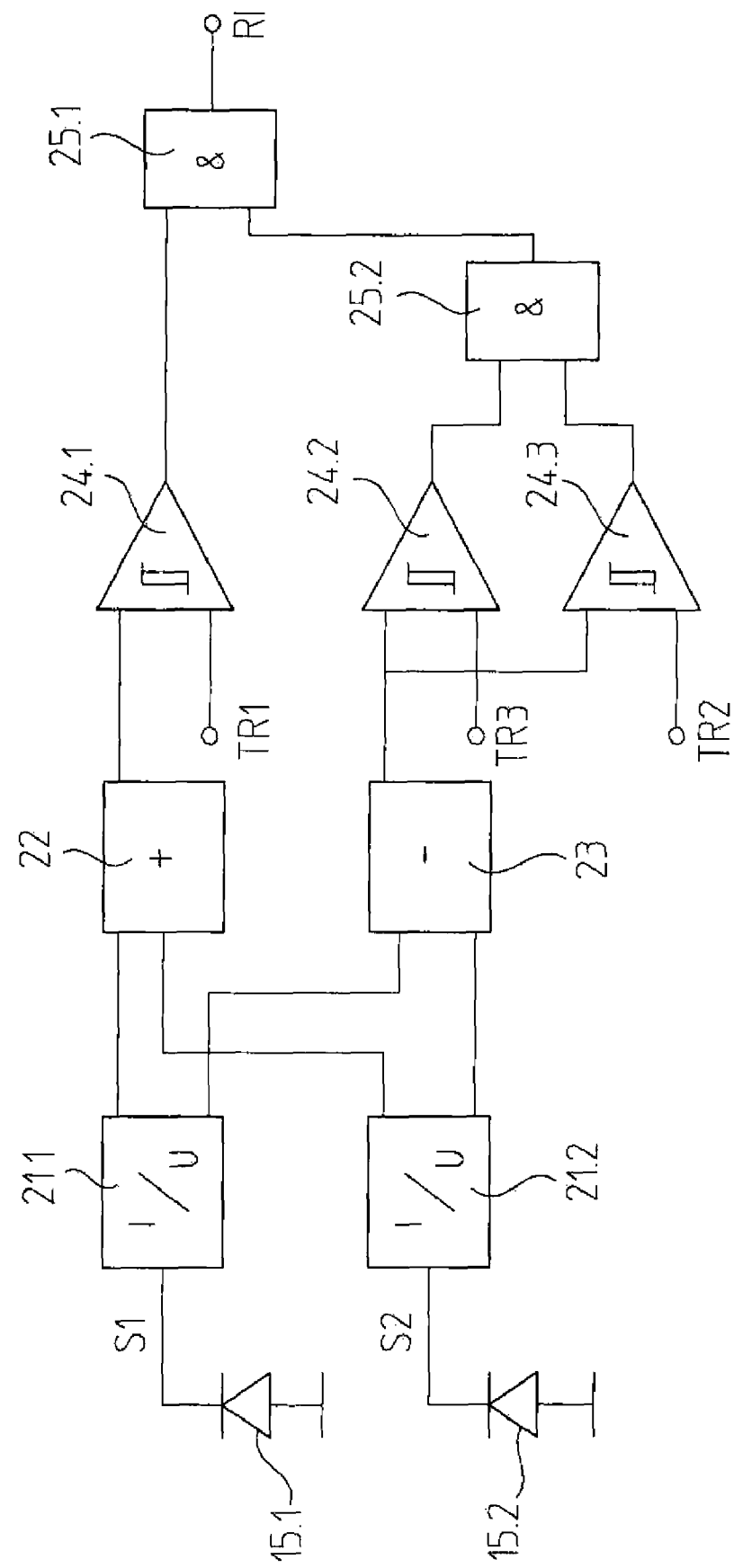
FIG. 5 is a schematic view of a suitable circuit system for processing the various signals and for generating the reference-pulse signal illustrated in FIGS. 4a to 4c.

In the process, signals S1, S2 at reference-pulse detector elements 15.1, 15.2 are conveyed to current-voltage converters 21.1, 21.2. Via downstream sum- and difference-calculation elements 22, 23, respectively, a sum signal S1+S2 as well as a difference signal S1−S2 are subsequently generated. Associated sum and difference signals S1+S2, S1−S2 are shown in the region of reference position $X_{REF}$ in FIG. 4*b*. Sum signal S1+S2 is supplied to a first comparator element 24.1 at whose other input the reference signal or trigger threshold TR1 is applied. Difference signal S1−S2 is conveyed to a second and third comparator element 24.2, 24.3 at whose other inputs trigger thresholds TR3 and TR2 are applied as reference signals. FIG. 4*b* illustrates the position of the different trigger thresholds TR1, TR2 and TR3 with respect to sum and difference signal S1+S2, S1−S2. The output signal of first comparator element 24.1 is supplied to a first input of an AND gate element 25.1. Its second input is supplied with the output signal of a second AND gate element 25.2 to which the output signals of second and third comparator elements 24.2, 24.3 are conveyed. Given the indicated selection of trigger thresholds TR1, TR2, TR3 and the indicated interconnection, i.e., via implemented logical AND operations, the desired reference-pulse signal RI, having a width, e.g., $b_{RI}$=0.5 μm which corresponds to the width $b_{INC}$ of generated incremental signals $INC_A$, $INC_B$, results at the output of gate element 25.1 as illustrated in FIG. 4*c*.

Further details for an example embodiment of reference marking 31 on the side of reflection-measuring graduation 30 is described below. With the aid of the measures discussed below it can be provided, for example, that the position of the neutral point of rotation in the generation of reference-pulse signal RI is adaptable to the position of the neutral point of rotation in the generation of the incremental signal. This constitutes a significant measure for avoiding faulty measurements in the event of possible tilting of scanning unit 10 and reflection-measuring graduation 30.

For this purpose, it is provided that the previously mentioned structure elements 31.1, 31.2 of reference marking 31 are arranged as diffractive optical elements or diffractive structure elements which, in measuring direction x, optically act like a cylinder lens having a specific focal length t, and which thus have a virtual or real focal point at the distance of focal length f from the reflection-measuring graduation in measuring direction x. In the y-z plane, structure elements 31.1, 31.2 have an optical effect such that they act as a grating having transversal period T1 or T2.

Selected focal length f of structure elements 31.1, 31.2 may correspond to one half of the distance between the neutral point of rotation of the incremental-signal scanning and reflection-measuring graduation 30, if it is located above or below reflection-measuring graduation 30 for system-related reasons. In this manner, the position of the neutral point of rotation in the generation of the reference-pulse signal is able to be adapted to the position of the neutral point of rotation in the generation of the incremental signals. Should tilting of scanning unit 10 and reflection-measuring graduation 30 occur, it is possible to avoid errors in the position measurement that would otherwise result.

Furthermore, it is provided to adapt imaging optics 12 in scanning unit 10 on the object-side to the position of the focal plane of structure elements 31.1, 31.2. Via imaging optics 12, this focal plane is imaged into the diaphragm plane where diaphragm structures 13.1, 13.2 are situated. These requirements may be characterized by the phase function of imaging optics 12 in the following manner:

in which:

$$P = \frac{2\pi}{\lambda_D}\left(\sqrt{x^2 + (a_1 \pm f)^2} + n\sqrt{x^2 + a_2^2}\right) \quad \text{(equation 1)}$$

$\lambda_D$ represents the wavelength of the utilized light source;
x represents the coordinate in the measuring direction;
$a_1$ represents the distance between the measuring-graduation plane and the imaging optics;
$a_2$ represents the distance between the imaging optics and the diaphragm plane;
n represents the refractive index of the scanning plate; and
f represents the focal lengths of the structure elements of the reference marking.

The phase function describes the geometry of imaging optics 12 in the form of the contour lines of this element. Imaging scale m of imaging optics 12 may be selected as follows:

$$m = -n\frac{(a_1 \pm f)}{a_2} \quad \text{(equation 2)}$$

in which:
- $a_1$ represents the distance between the measuring-graduation plane and the imaging optics;
- $a_2$ represents the distance between the imaging optics and the diaphragm plane;
- n represents the refractive index of the scanning plate; and
- f represents the focal lengths of the structure elements of the reference marking.

Figure 6A:
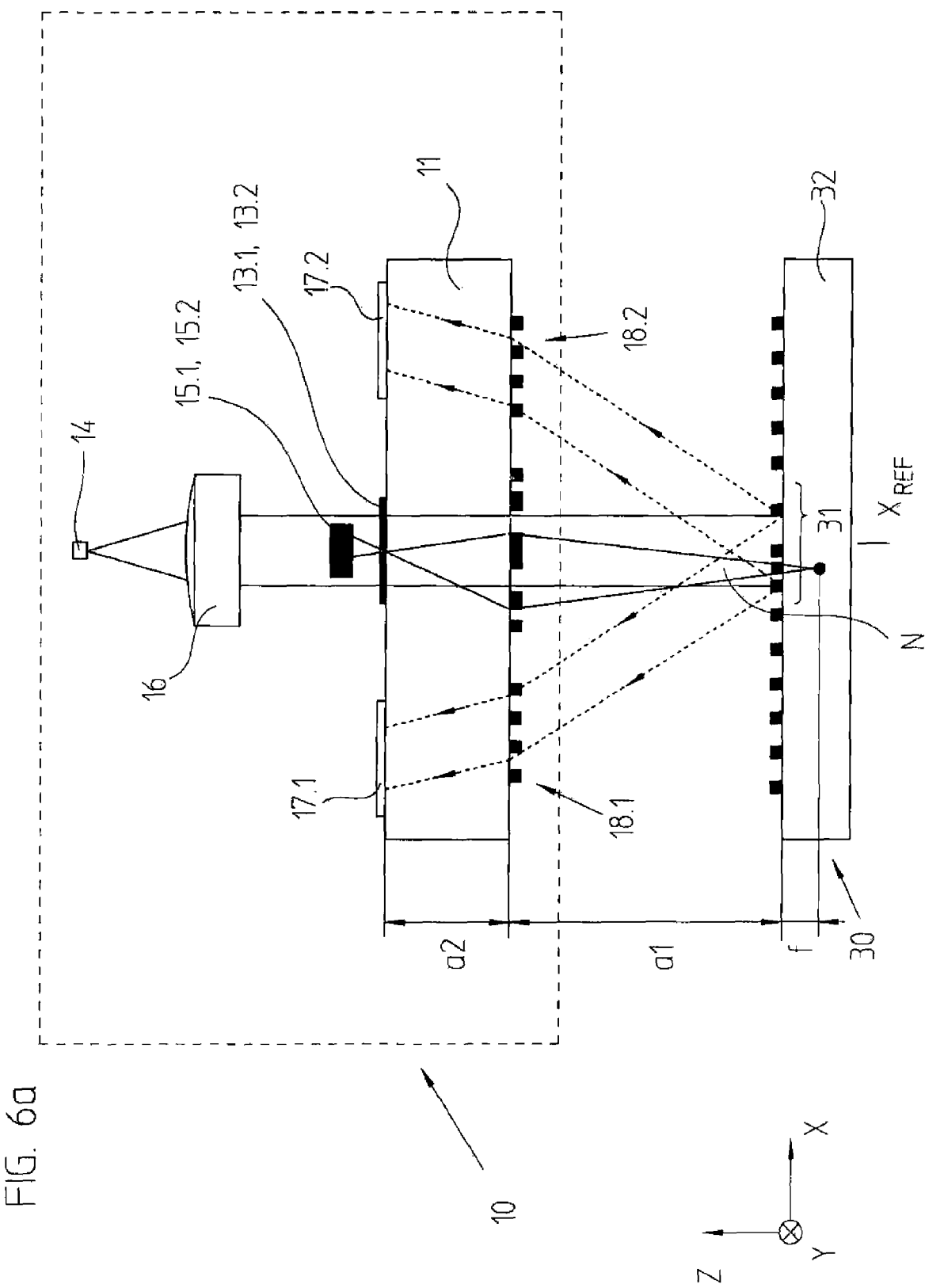
FIG. 6a to 6c are various illustrations, analogous to FIG. 1b, with different positions of the neutral point of rotation or with a tilted reflection-measuring graduation.

FIG. 6a schematically illustrates the situation where neutral point of rotation N is located considerably below the measuring-graduation plane for scanning-related reasons. As can be seen, focal length f of structure elements 31.1, 31.2 of reference marking 31 is selected to equal one half of the distance of neutral point of rotation N from reflection-measuring graduation 30, and imaging optics 12 is adapted to the position of the focal plane.

Figure 6B:
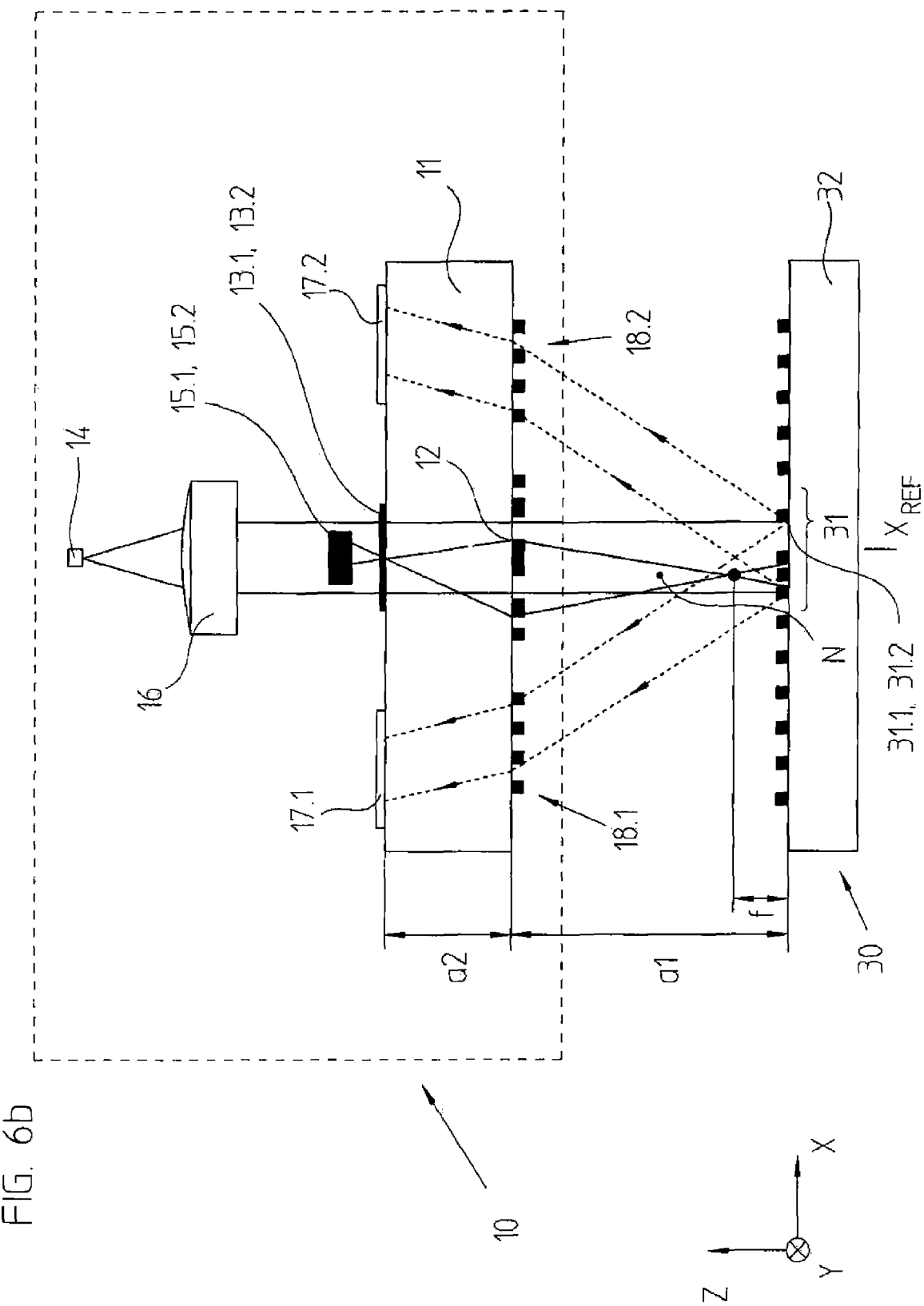
Figure 6C:
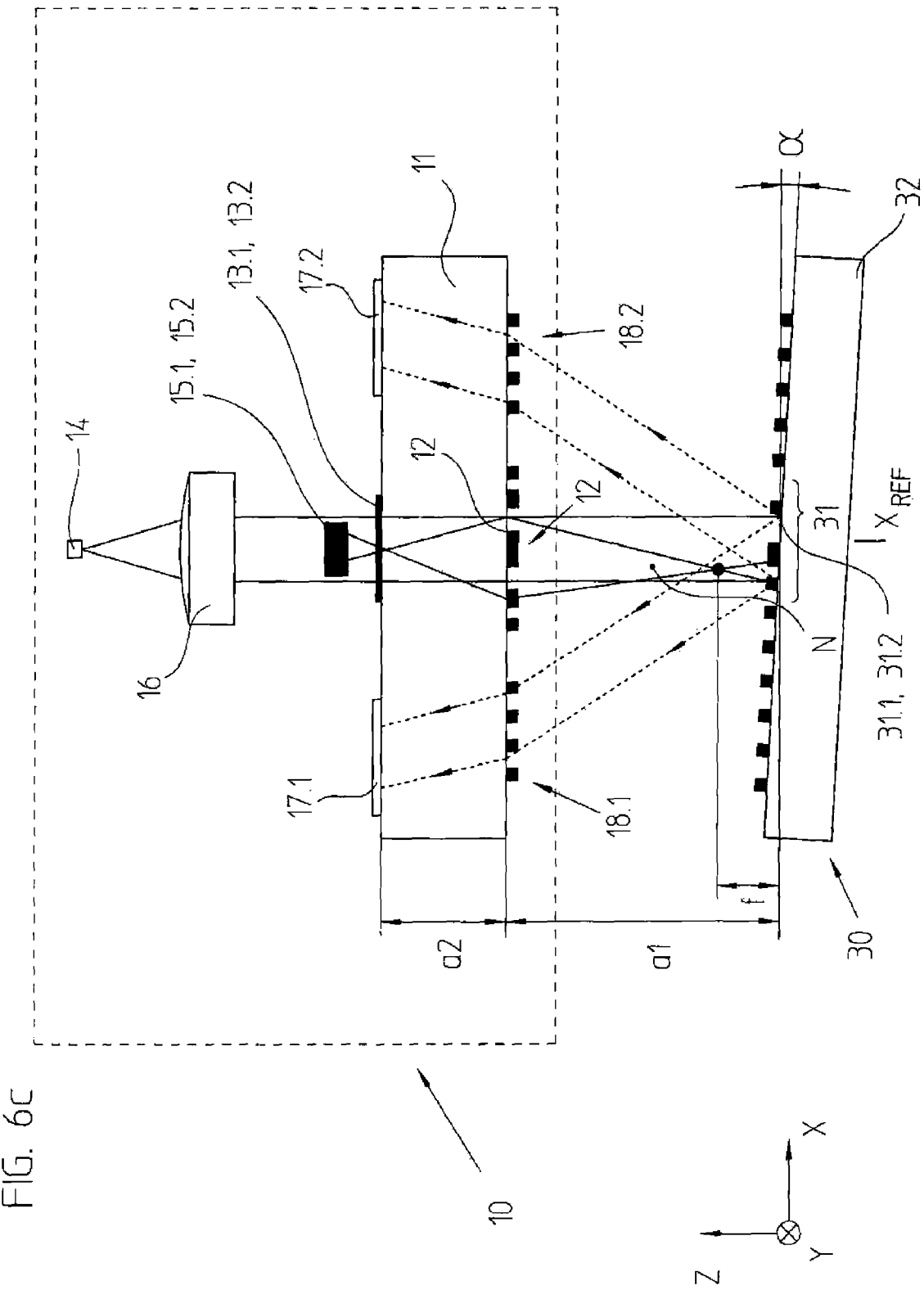

In contrast, FIG. 6b schematically illustrates the situation where neutral point of rotation N is located considerably above the measuring-graduation plane for scanning-related reasons. As can be seen, focal length f of structure elements 31.1, 31.2 of reference marking 31 is selected to equal one half of the distance of neutral point of rotation N from reflection-measuring graduation 30, and imaging optics 12 is adapted to the position of the focal plane.

In the situation illustrated in FIG. 6b, possible tilting of reflection-measuring graduation 30 about an axis in the y-direction by an angular amount α (cf. FIG. 6c) shifts the focus of imaging optics 12 by 2fα in linear approximation. This corresponds to the shift amount of the incremental signals, i.e., the tilting affects the reference-signal generation and the incremental-signal generation in the same or similar manner.

Via the described arrangement of the reference marking, it is possible to bring the neutral point of rotation in the reference-pulse signal generation into congruence with the neutral point of rotation in the incremental-signal generation in the first position-measuring device. Due to the measures described herein, possible tilting of the reflection-measuring graduation relative to the scanning unit will affect both signals in the same manner. The afore-described approach using the structure elements having a specific optical effect allows an adaptation of the position of the neutral point of rotation of the reference-pulse signal generation for those cases where the neutral point of rotation of the incremental-signal generation is located at a considerable distance from the measuring-graduation plane as a result of the scanning principle.

Furthermore, given appropriate scanning principles, it may also occur that the neutral point of rotation of the incremental-signal generation is located in relatively close proximity to the measuring-graduation plane. In this case, it may be provided that individual sets of structure elements are not provided with the mentioned optical cylinder-lens characteristics, but if instead a rectangular cross-sectional form is chosen for the structure elements. The mixed arrangement of the sets of the afore-described structure elements having a defined optical effect on the one hand, and the sets of structure elements without such an optical effect on the other hand, makes it possible to shift the neutral point of rotation of the reference-pulse signal generation into the immediate vicinity of the measuring-graduation plane.

Figure 7A:
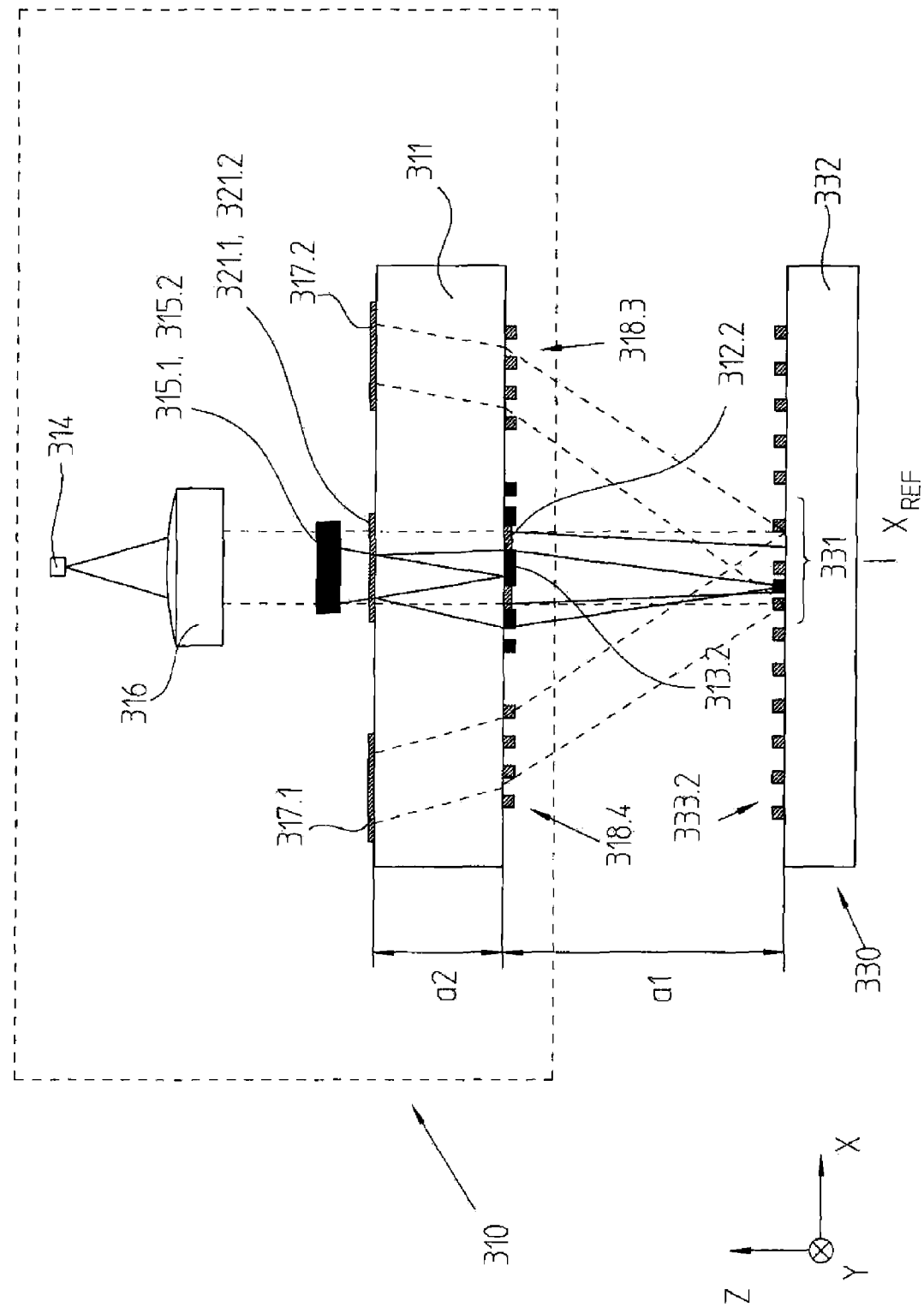
FIG. 7a is a schematic view of paths of scanning-beam components of a variant of the position-measuring device, to describe the generation of reference-pulse signals.
Figure 7B:
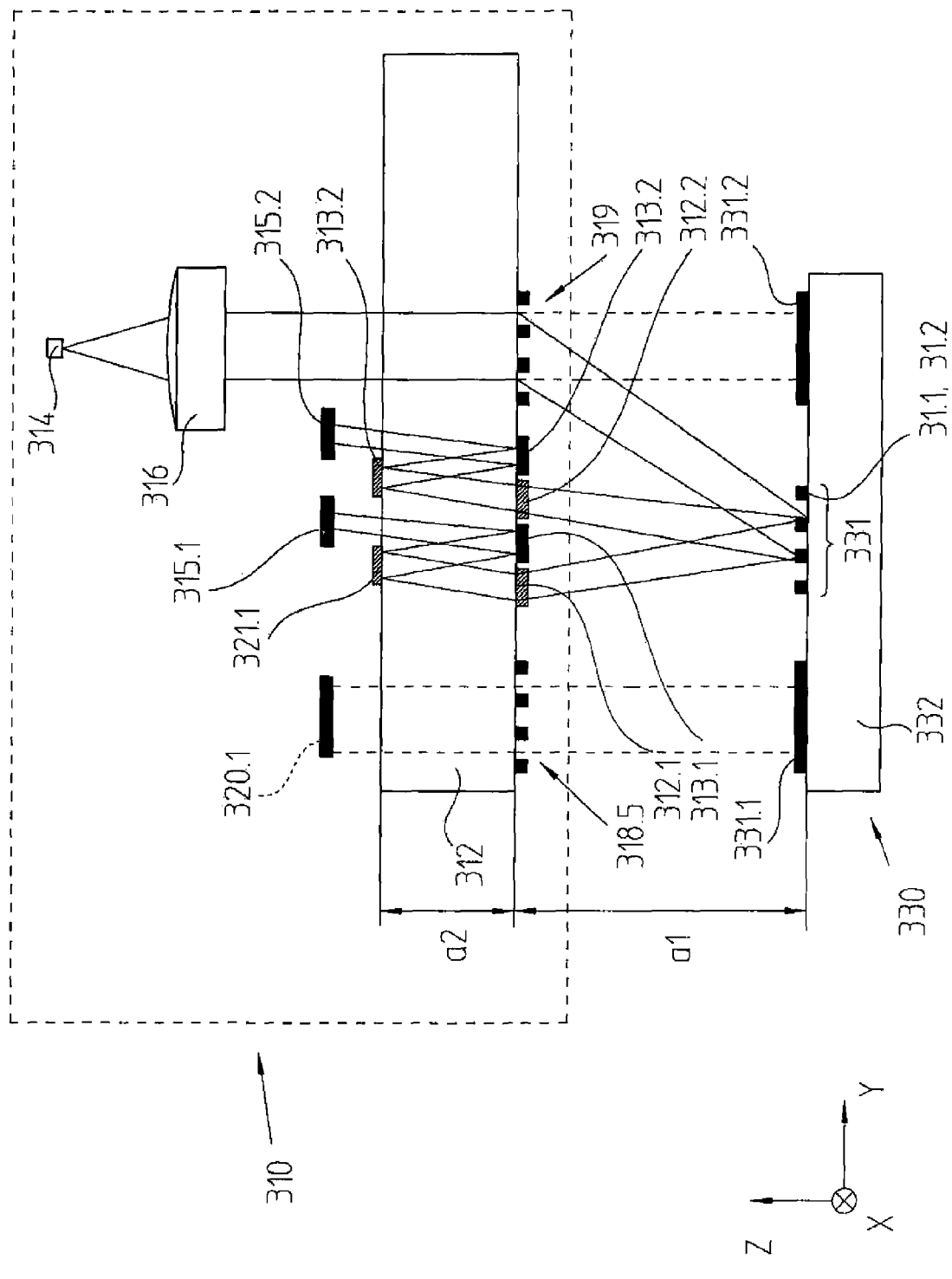
FIG. 7b is a schematic view of paths of scanning beam components of the position-measuring device illustrated in FIG. 7a, to describe the generation of reference-pulse signals.
Figure 8A:
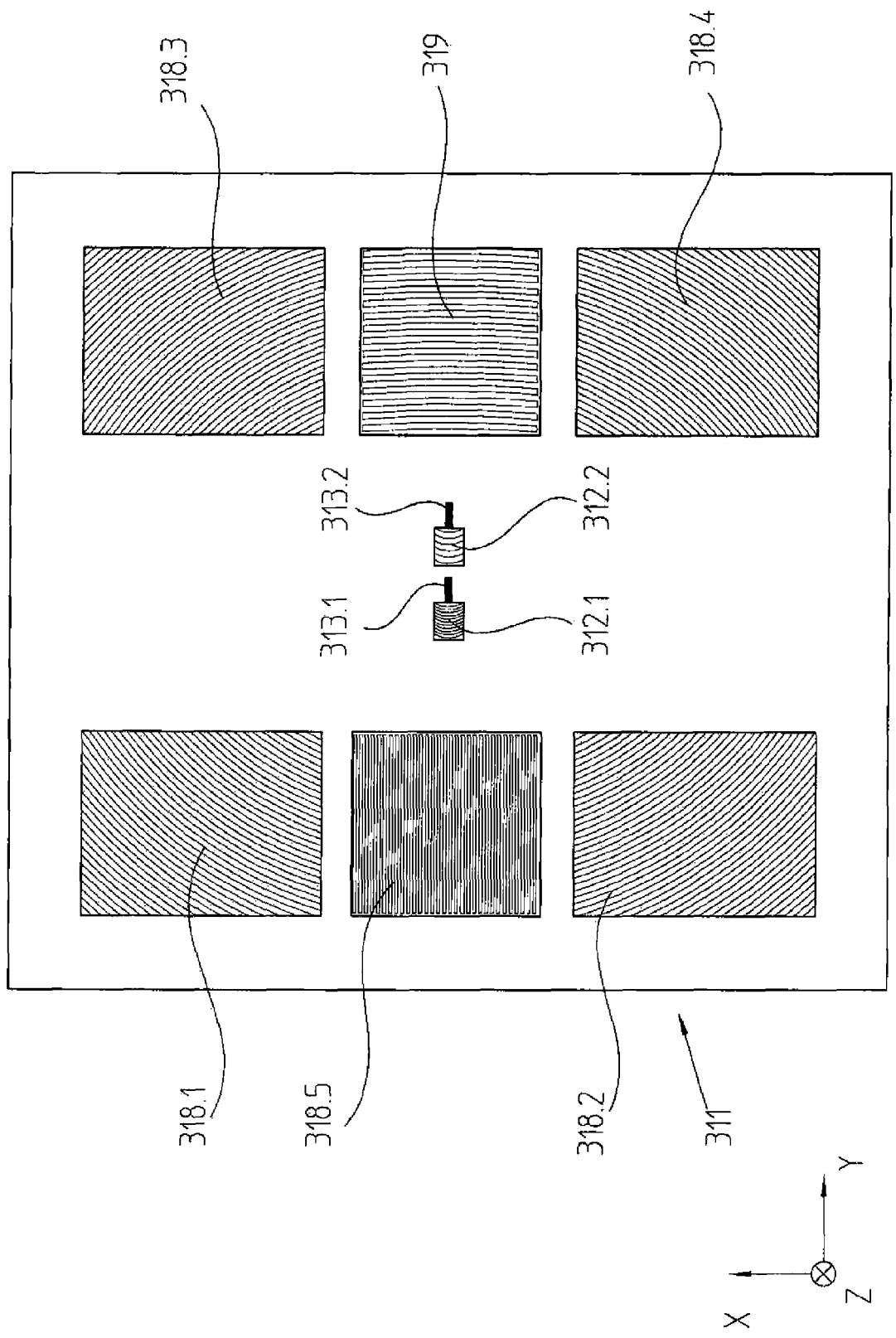
FIG. 8a is a plan view of the underside of the scanning plate of the variant of the position-measuring device.
Figure 8B:
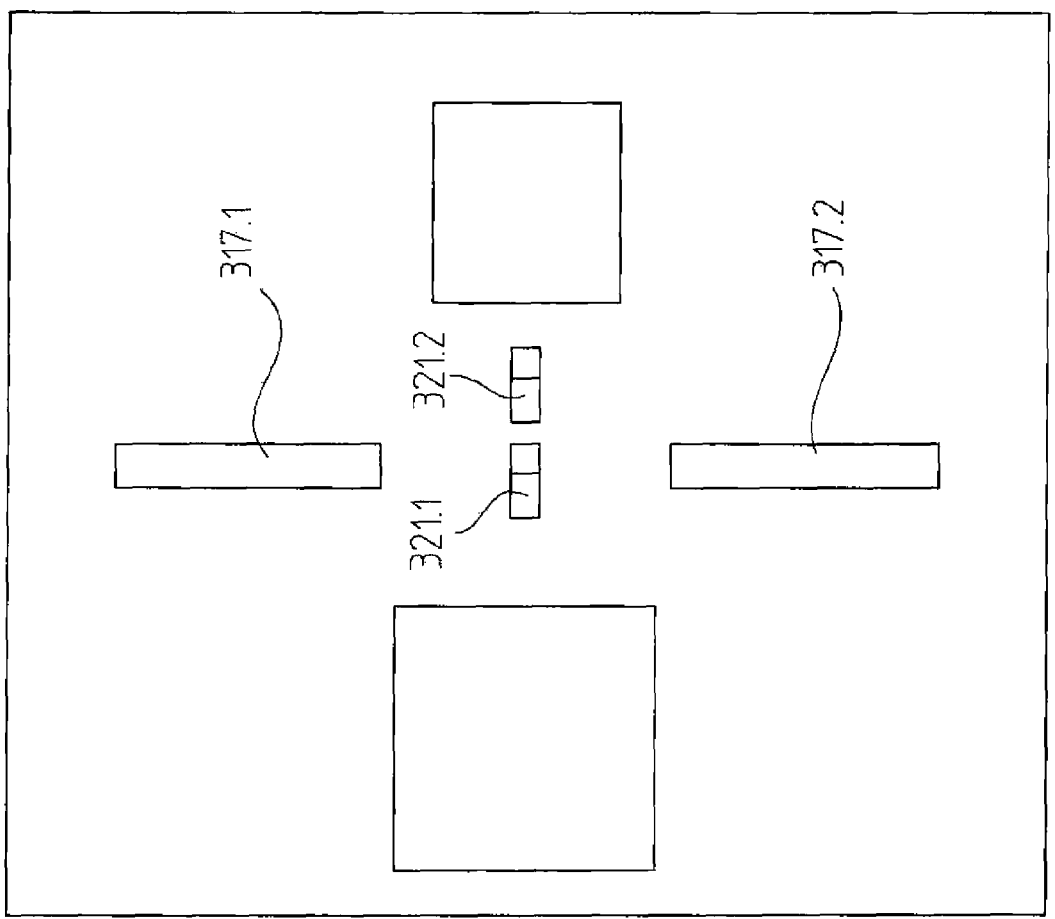
FIG. 8b is a top view of the top surface of the scanning plate of the variant of the position-measuring device.

A variant of the position-measuring device, which differs slightly from the example described above, is described with reference to FIGS. 7a, 7b, 8a and 8b. Analogously to the previously-described example, FIGS. 7a and 7b illustrate paths of scanning-beam components of this variant of the position-measuring device. FIGS. 8a and 8b illustrate views of the underside and top surface of the scanning plate. Only the particular components or functions thereof that differ from those of the above example are described below.

The paths of scanning-beam components indicated in the figures by a solid line represent the beam paths that are used for the generation of the reference-pulse signals, and the paths of scanning beam components shown by the dashed line represent the beam paths used for the generation of the incremental signals.

In contrast to the above-described example, for one, convergent illumination of reference marking 331 on reflection-measuring graduation 330 is provided. Convergent illumination of reference marking 331 has certain advantages insofar as the position of the neutral point of rotation of the reference-pulse signal generation is thus largely independent of the scanning distance between reflection-measuring graduation 330 and scanning unit 310. In FIG. 7b, the convergent illumination-beam path between splitting grating 319 and reference marking 331 is illustrated. Furthermore, the independence of the position of the neutral point of rotation of the incremental-signal generation from the scanning distance is provided by the selected scanning of incremental graduations 333.1, 333.2.

To provide such convergent illumination of reference marking 331, splitting grating 319 in scanning unit 310 in the illustrated variant of the position-measuring device is arranged as an imaging lens in the form of a diffractive beam-splitter element having curved grating lines, as this is also illustrated in the view of the underside of scanning plate 311 in FIG. 8a.

Arranging the splitting grating 319 as an imaging lens entails another modification of the scanning-beam path in this variant of the position-measuring device. It is important, for example, that splitting grating 319 and diaphragm structures 313.1, 313.2 on scanning plate 311 are in precise alignment with each other so that the resulting reference-pulse signals remain unchanged in their position even if the scanning distance is modified. To be able to provide the precise alignment of these components during the production in a technologically simpler manner, diaphragm structures 313.1, 313.2 and splitting grating 319 are disposed on the same side of scanning plate 311 in this variant, in contrast to the above-described example. FIG. 8a illustrates the underside of scanning plate 311, where individual diaphragm structures 313.1, 313.2 are disposed adjacent to the components of imaging optics 312.1, 312.2 in the y-direction.

As an alternative, the diaphragm structures and the splitting grating may also be mounted on the top surface of the scanning plate.

To allow diaphragm structures 313.1, 313.2 to be placed on the underside of scanning plate 311, in contrast to the above-described example, reflector elements 321.1, 321.2 are disposed in the scanning-beam path on the top surface of scanning plate 311 in addition, as illustrated in FIG. 8b, for example. With regard to the scanning-beam path, this has the result that—as can be gathered from FIG. 7b—the beam components reflected by reference marking 331 in the direction of scanning unit 310, are initially imaged by imaging optics 312.1, 312.2—which consists of two parts in this example—via the additional reflector elements 321.1, 321.2 into the plane of diaphragm structures 313.1, 313.2 on the underside of scanning plate 311. Reflector elements 321.1, 321.2 are illustrated in the view of the top surface of scanning plate 311 in FIG. 5b. The back reflection in the direction of detector elements 315.1, 315.2 for the generation of the reference pulses takes place via diaphragm structures 313.1, 313.2 on the underside of scanning plate 311. Because of this beam path, diaphragm structures 313.1, 313.2 in this variant are not arranged as light-transmitting/opaque structures, but as reflective/non-reflective structures.

The scanning-beam path for generating reference-pulse signals, which is slightly modified in comparison with the above-described example, requires yet another modification. For example, it can be gathered from FIG. 7b that, in addition to the imaging optical effect, a transversal deflection effect in the y-direction via imaging optics 312.1 or 312.2 is provided as well. This may be ensured if each imaging optics 312.1, 312.2 is arranged as grating-lens structure, as schematically illustrated in the view of the underside of scanning plate 311 in FIG. 8a.

Apart from the above-mentioned modifications, the generation of the reference-pulse signals and the incremental pulse signals in this variant of the position-measuring device functions as in the example discussed above.

A position-measuring device according to an example embodiment of the present invention is described with reference to FIGS. 9a to 11.

FIGS. 9a and 9b illustrate, in highly schematic form and in different views, paths of scanning-beam components for generating the incremental signals and the reference-pulse signal in the position-measuring device.

In FIGS. 9a and 9b, the paths of scanning-beam components for generating the reference-pulse signals are indicated by solid lines, and the paths of scanning-beam components for generating the incremental signals are indicated by dashed lines in each case.

The position-measuring device includes a scanning unit 410, which is arranged so as to be displaceable with respect to a measuring graduation, configured as reflection-measuring graduation 430, at least in measuring direction x.

In contrast to the above-described position-measuring device, reflection-measuring graduation 430 includes two reference-marking tracks extending in parallel in measuring direction x, each of which has a reference marking 431.1, 431.2 at least one reference position $X_{REF}$. Reference markings 431.1, 431.2 are formed in symmetry with axis of symmetry $S_X$ illustrated in FIG. 10, which extends along measuring direction x. An incremental graduation track with a periodic incremental graduation 433 is disposed between the reference-marking tracks.

Scanning unit 410 includes a first scanning device for generating a reference-pulse signal RI at reference position $X_{REF}$. Via the first scanning device or the corresponding scanning-beam path, it is provided that reference markings 431.1, 431.2 in the reference-marking tracks are acted upon at least once in a reference-pulse scanning field 451.1, 451.2 by the scanning beam so as to generate reference-pulse signal RI. The individual reference-pulse scanning fields 451.1, 451.2 in the reference-marking tracks are illustrated in FIG. 10.

Furthermore, a second scanning device, which is used to generate periodic incremental signals $INC_A$, $INC_B$, is provided on the side of scanning unit 410. Via a corresponding scanning-beam path, the second scanning device provides that incremental graduation 433 is acted upon at least once in two incremental-signal scanning fields 453.1, 453.2 to generate incremental signals $INC_A$, $INC_B$, as can also be gathered from FIG. 10.

Reference markings 431.1, 431.2 arranged adjacent to incremental graduation 433 on both sides, are each configured as cylinder lenses, which are provided in mirror-symmetry with an axis of symmetry $S_X$, as mentioned above. Axis of symmetry $S_X$ extends in parallel to measuring direction x in the measuring-graduation plane. Reference markings 431.1, 431.2 may be formed in mirror symmetry with an additional axis of symmetry $S_Y$, which extends perpendicular to measuring direction x in the measuring-graduation plane.

The generation of reference-pulse signal RI, and the scanning-beam path in the position-measuring device provided by the first scanning device is described below with reference to the solid line illustrated in FIGS. 9a and 9b.

In this manner, the collimated beam $S_{RI}$ emitted by a light source falls on first reference marking 431.2 on reflection-measuring graduation 430. There, the incident beam is diffracted and split up into reflected +1/−1 orders of diffraction, which propagate in the direction of scanning unit 410. In order to achieve sufficient spatial separation of the back-reflected, diffracted beam components from the incident beam, or to achieve sufficient splitting of the same in the x-z plane, reference marking 431.1 formed as cylinder lens has a transversal periodicity $T_{RI1}$.

The divergent beam components reflected back to scanning unit 410 fall on diffractive scanning gratings 418.1, 418.2 in scanning unit 410, which are arranged on the underside of a scanning plate 411. Scanning gratings 418.1, 418.2 collimate the incident beams again and deflect them relative to the scanning-plate plane such that the optical axes of the beam components are oriented perpendicular to the scanning-plate plane once they have passed through scanning plate 411. The beam components reach mirrored surfaces of a downstream roof prism, which act as reflector elements 413.1, 413.2 and deflect the beam components in the direction of two additional diffractive scanning gratings 418.3, 418.4, which are disposed on the underside of scanning plate 411. Via the two scanning gratings 418.3, 418.4, the two beam components are deflected such that they propagate convergingly in the direction of second reference marking 431.2 on measuring graduation 430. In the region of second reference marking 431.2, arranged as a cylinder lens with transversal periodicity $T_{RI2}$, the beam components interfere and from there are once again reflected back in the direction of scanning unit 410, where they reach a plurality of reference-pulse detector elements of which only reference-pulse detector element 415 is illustrated. If reference markings 431.1, 431.2 are crossed, a reference-pulse signal RI will result at reference-pulse detector elements 415.

In this position-measuring device, various optical elements in scanning unit 410 or in elements assigned to scanning unit 410 are among the aforementioned first scanning device for generating reference-pulse signal RI. Among these would be, for example, scanning gratings 418.1 to 418.4 as well as reflector elements 413.1, 413.2, and also reference-pulse detector elements 415.

In the following text, the generation of incremental signals $INC_A$, $INC_B$, which are generated in the position-measuring device utilizing the second scanning device, is described with reference to FIGS. 9a to 11. The corresponding scanning-beam path is indicated by a dashed line in FIGS. 9a and 9b.

In a first incremental-signal scanning field 453.1, the collimated beam $S_{INC}$ emitted by a light source falls onto incremental graduation 453 of reflection-measuring graduation 430 for the first time. A single shared light source may be utilized, which supplies the first and second scanning devices with light for scanning incremental graduation 433 and reference markings 431.1, 431.2. It should be understood that this does not rule out the use of two separate light sources. In the first incremental-signal scanning field 453.1, the incident beam is diffracted and split up into reflected +/−1 orders of deflection, which propagate in the direction of scanning unit 410. Upon passage through scanning grating 418.5, 418.6 on the underside of scanning plate 411, the beam components are subjected to another deflection, such that they propagate perpendicular to the scanning-plate plane, in the direction of the mirrored areas of the downstream roof prism acting as reflector elements 413.1, 413.2. From reflector elements 413.1, 413.2, the beam components are reflected back in the direction of two additional scanning gratings 418.7, 418.8, which are arranged on the underside of scanning plate 411. Having passed through scanning gratings 418.7, 418.8, the beam components fall onto incremental graduation 433 in a second incremental-signal scanning field 4S3.2 for a second time, where an interference takes place. From second incremental-signal scanning field 453.2, a plurality beams are reflected back in the direction of scanning unit 410, where they strike the plurality of incremental-signal detector elements.

In the event of relative movements of measuring graduation and scanning unit 410, periodic, phase-shifted incremental signals result at the incremental-signal detector elements, which may be converted, e.g., in a conventional manner, into a pair of incremental signals $INC_A$, $INC_B$ with 90° phase shift.

Thus, various optical elements in scanning unit 410 or elements assigned to scanning unit 410 function as a second scanning device for generating incremental signals $INC_A$, $INC_B$ in the position-measuring device. Among these are scanning gratings 418.5 to 418.8 as well as reflector elements 413.1, 413.2 and also the incremental-signal detector elements.

As a result, it is provided via the second scanning device that the centrically disposed incremental graduation 433 is acted upon once by the beams utilized for the scanning in the two incremental-signal scanning fields 453.1, 453.2.

As can be gathered from FIG. 10, for example, the centers of the two incremental-signal scanning fields 453.1, 453.2 in the illustrated example are located on a first straight line $G_{Y1}$, which extends perpendicular to measuring direction x in the measuring-graduation plane. The centers of the two reference-pulse signal scanning fields 451.1, 451.2 are located on a second straight line $G_{Y2}$, which extends perpendicular to measuring direction x in the measuring-graduation plane and which coincides with the previously mentioned straight symmetry line $S_Y$ in the illustrated exemplary embodiment. The two straight lines $G_{Y1}$ and $G_{Y2}$ are disposed at a mutual offset in measuring direction x. This offset placement of the scanning fields results in the suppression of signal crosstalk on the incremental track and it results in a compact design.

What is claimed is:

1. A position-measuring device for generating incremental signals and a reference-pulse signal at at least one reference position, comprising:
   a scanning unit; and
   a measuring graduation displaceable relative to the scanning unit in at least one measuring direction;
   wherein the measuring graduation includes two incremental-graduation tracks having periodic incremental graduations and extending in parallel in the measuring direction, a reference-marking track arranged between the incremental-graduation tracks and including a reference marking at at least one reference position;
   wherein the scanning unit includes a first scanning device configured to generate the reference-pulse signal and a second scanning device configured to generate the incremental signals;
   wherein each incremental graduation is arranged to be acted upon at least once in an incremental-signal scanning field by a scanning-beam to generate the incremental signals; and
   wherein the reference marking includes a plurality of structure elements arranged in mirror symmetry with respect to an axis of symmetry oriented perpendicular to the measuring direction in a measuring-graduation plane.

2. The position-measuring device according to claim 1, wherein the structure elements of the reference marking are arranged in mirror symmetry with respect to an axis of symmetry that extends in parallel to the measuring direction in the measuring-graduation plane.

3. A position-measuring device for generating incremental signals and a reference-pulse signal at at least one reference position, comprising:
   a scanning unit; and
   a measuring graduation displaceable relative to the scanning unit in at least one measuring direction;
   wherein the measuring graduation includes two incremental-graduation tracks having periodic incremental graduations and extending in parallel in the measuring direction, a reference-marking track arranged between the incremental-graduation tracks and including a reference marking at at least one reference position;
   wherein the scanning unit includes a first scanning device configured to generate the reference-pulse signal and a second scanning device configured to generate the incremental signals;
   wherein each incremental graduation is arranged to be acted upon at least once in an incremental-signal scanning field by a scanning-beam to generate the incremental signals;
   wherein the reference marking on the measuring graduation is arranged to be acted upon once in a reference-pulse scanning via the first scanning device to generate the reference-pulse signal; and
   wherein centers of two incremental-signal scanning fields are located on a straight line in a measuring-graduation plane oriented perpendicular to the measuring direction, and a center of a reference-pulse scanning field is arranged offset to the straight line on the measuring graduation in the measuring direction.

4. A position-measuring device for generating incremental signals and a reference-pulse signal at a least one reference position, comprising:
   a scanning unit; and
   a measuring graduation displaceable relative to the scanning unit in at least one measuring direction;
   wherein the measuring graduation includes two incremental-graduation tracks having periodic incremental graduations and extending in parallel in the measuring direction, a reference-marking track arranged between the incremental-graduation tracks and including a reference marking at least one reference position;
   wherein the scanning unit includes a first scanning device configured to generate the reference-pulse signal and a second scanning device configured to generate the incremental signals;
   wherein each incremental graduation is arranged to be acted upon at least once in an incremental-signal scanning field by a scanning-beam to generate the incremental signals; and wherein the first scanning device includes:
a plurality of optical elements including at least one imaging optics and at least two diaphragm structures, arranged in a diaphragm plane and having a plurality of diaphragm openings; and
at least two reference-pulse detector elements.

5. The position-measuring device according to claim 4, wherein the imaging optics are dimensioned to image an image-side focal plane of structure elements of the reference marking into the diaphragm plane, and positional placement of the diaphragm openings of the two diaphragm structures is adapted to placement of the structure elements in the measuring direction.

6. The position-measuring device according to claim 5, wherein the scanning unit includes a scanning plate, the diaphragm structures and the imaging optics are disposed on the scanning plate.

7. A position-measuring device for generating incremental signals and a reference-pulse signal at at least one reference position, comprising:
a scanning unit; and
a measuring graduation displaceable relative to the scanning unit in at least one measuring direction;
wherein the measuring graduation includes two incremental-graduation tracks having periodic incremental graduations and extending in parallel in the measuring direction, a reference-marking track arranged between the incremental-graduation tracks and including a reference marking at at least one reference position;
wherein the scanning unit includes a first scanning device configured to generate the reference-pulse signal and a second scanning device configured to generate the incremental signals;
wherein each incremental graduation is arranged to be acted upon at least once in an incremental-signal scanning field by a scanning-beam to generate the incremental signals; and
wherein the second scanning device includes:
a plurality of optical elements including a plurality of scanning gratings, at least one combination grating and at least two reflector elements configured to back reflect beams coming from a first incremental-signal scanning field into a second incremental-signal scanning field; and
a plurality of incremental-signal detector elements.

8. The position-measuring device according to claim 7, wherein the reference marking includes a plurality of structure elements arranged in mirror symmetry with respect to an axis of symmetry oriented perpendicular to the measuring direction in a measuring-graduation plane.

9. The position-measuring device according to claim 8, wherein the structure elements of the reference marking are arranged in mirror symmetry with respect to an axis of symmetry that extends in parallel to the measuring direction in the measuring-graduation plane.

10. The position-measuring device according to claim 7, wherein the reference marking on the measuring graduation is arranged to be acted upon once in a reference-pulse scanning via the first scanning device to generate the reference-pulse signal.

11. The position-measuring device according to claim 10, wherein centers of two incremental-signal scanning fields and a center of a reference-pulse scanning field are located on a straight line in a measuring-graduation plane oriented perpendicular to the measuring direction.

12. The position-measuring device according to claim 10, wherein centers of two incremental-signal scanning fields are located on a straight line in a measuring-graduation plane oriented perpendicular to the measuring direction, and a center of a reference-pulse scanning field is arranged offset to the straight line on the measuring graduation in the measuring direction.

13. The position-measuring device according to claim 7, wherein, at the reference position, the reference marking includes:
at least one set of first structure elements arranged in a plane of the measuring graduation, perpendicular to the measuring direction, periodically with a first transversal periodicity; and
at least one set of second structure elements arranged in the plane of the measuring graduation, perpendicular to the measuring direction, periodically with a second transversal periodicity, the first transversal periodicity and the second transversal periodicity differing from each other;
wherein the structure elements are arranged as diffractive structure elements which, in the measuring direction, optically act as a cylinder lens having a specific focal length and, perpendicular to the measuring direction, act as a deflecting grating having one of (a) the first transversal periodicity and (b) the second transversal periodicity; and
wherein, in the measuring direction, the structure elements have one of (a) a virtual and (b) a real focal point at a focal-length distance from the reflection-measuring graduation.

14. The position-measuring device according to claim 7, wherein the first scanning device includes:
a plurality of optical elements including at least one imaging optics and at least two diaphragm structures, arranged in a diaphragm plane and having a plurality of diaphragm openings; and
at least two reference-pulse detector elements.

15. The position-measuring device according to claim 14, wherein the imaging optics are dimensioned to image an image-side focal plane of structure elements of the reference marking into the diaphragm plane, and positional placement of the diaphragm openings of the two diaphragm structures is adapted to placement of the structure elements in the measuring direction.

16. The position-measuring device according to claim 15, wherein the scanning unit includes a scanning plate, the diaphragm structures and the imaging optics are disposed on the scanning plate.

17. The position-measuring device according to claim 7, wherein the scanning unit includes a scanning plate, the scanning gratings, the combination grating and the reflector elements arranged on the scanning unit.

18. The position-measuring device according to claim 7, wherein the scanning unit is assigned a light source configured to supply the first scanning device and the second scanning device with light to scan the incremental graduations and the reference marking, the scanning unit including a splitting grating configured to split the beam coming from the light source into a first beam component for the first scanning device to generate of reference-pulse signals and into a second beam component for the second scanning device to generate the incremental signals.

19. The position-measuring device according to claim 18, wherein the splitting grating is configured to provide convergent illumination of the reference marking.

20. The position-measuring device according to claim 18, wherein the scanning unit includes a scanning plate, the scanning gratings, the combination grating and the reflector elements arranged on the scanning unit, the splitting grating disposed on a side of the scanning plate that faces the measuring graduation.

* * * * *